United States Patent
Huang et al.

(10) Patent No.: US 12,327,113 B2
(45) Date of Patent: Jun. 10, 2025

(54) ADAPTING SCRIPTS FROM A SOURCE PLATFORM TO BE UTILIZED IN A TARGET PLATFORM

(71) Applicant: International Business Machines Corporation, Armonk, NY (US)

(72) Inventors: Yan Huang, Beijing (CN); Lei Wang, Beijing (CN); Shuang Shuang Jia, Beijing (CN); Wen Ya Zhou, Beijing (CN); Qing Yu Pei, Beijing (CN); Jiangang Deng, Beijing (CN); Qi Li, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 18/234,069

(22) Filed: Aug. 15, 2023

(65) Prior Publication Data
US 2025/0060960 A1    Feb. 20, 2025

(51) Int. Cl.
*G06F 9/44*          (2018.01)
*G06F 8/41*          (2018.01)
(Continued)

(52) U.S. Cl.
CPC ............... *G06F 8/76* (2013.01); *G06F 8/427* (2013.01); *G06F 11/3636* (2013.01)

(58) Field of Classification Search
CPC ......... G06F 8/76; G06F 8/427; G06F 11/3636
See application file for complete search history.

(56) References Cited

U.S. PATENT DOCUMENTS

| | | | | |
|---|---|---|---|---|
| 6,725,451 B1 * | 4/2004 | Schuetz | ............. | G06F 9/45537 717/151 |
| 7,185,344 B2 * | 2/2007 | Grover | ..................... | G06F 8/70 719/310 |

(Continued)

OTHER PUBLICATIONS

Frank Gerhardt, "Tool Support for Software Migration Through Integration of the Programming Environments of the Source and Target Platforms," Association for Computing Machinery, Jul. 24, 2001, pp. 1-22.

*Primary Examiner* — Qamrun Nahar
(74) *Attorney, Agent, or Firm* — Shackelford, McKinley & Norton, LLP; Robert A. Voigt, Jr.

(57) ABSTRACT

A computer-implemented method, system, and computer program product for adapting scripts from a source platform to be utilized in a target platform when porting. Traces of system calls from the commands in the source and target platforms are analyzed to identify building blocks. A tree structure for each command of the source and target platforms is constructed with one or more building blocks from the identified building blocks. Commands of the target platform with a functionality within a threshold degree of similarity to the commands of the source platform are identified by analyzing the building blocks of the commands' tree structures. Alternative commands for the commands of the source platform, such as those commands that are not supported by the target platform, may be generated using such identified commands. The script from the source platform may then be adapted to be utilized in the target platform using such alternative commands.

20 Claims, 12 Drawing Sheets

(51) Int. Cl.
*G06F 8/76* (2018.01)
*G06F 11/362* (2025.01)

(56) References Cited

U.S. PATENT DOCUMENTS

| | | | |
|---|---|---|---|
| 7,356,808 B2* | 4/2008 | Bonsteel | G06F 9/45537 |
| | | | 717/138 |
| 9,378,014 B2* | 6/2016 | Wilson | G06F 8/76 |
| 11,082,438 B2 | 8/2021 | Peinador et al. | |
| 2002/0138821 A1* | 9/2002 | Furman | G06F 8/76 |
| | | | 717/128 |
| 2017/0161039 A1* | 6/2017 | Banerjee | G06F 8/76 |
| 2020/0076841 A1 | 3/2020 | Hajimirsadeghi et al. | |

* cited by examiner

ADAPTING SCRIPTS FROM A SOURCE PLATFORM TO BE UTILIZED IN A TARGET PLATFORM

TECHNICAL FIELD

The present disclosure relates generally to porting, and more particularly to adapting scripts from a source platform to be utilized in a target platform when porting, such as porting open-source tools.

BACKGROUND

In software engineering, porting is the process of adapting software for the purpose of achieving some form of execution in a computing environment that is different from the one that a given program was originally designed for execution (e.g., different CPU, operating system, or third party library).

SUMMARY

In one embodiment of the present disclosure, a computer-implemented method for adapting scripts from a source platform to be utilized in a target platform when porting comprises analyzing system call traces of commands from the source and target platforms to identify building blocks. The method further comprises constructing a tree structure for each command of the source and target platforms with one or more building blocks of the identified building blocks. The method additionally comprises identifying commands of the target platform with a functionality within a threshold degree of similarity of commands of the source platform by analyzing building blocks of the tree structures of the commands of the source and target platforms. Furthermore, the method comprises generating one or more alternative commands for the source platform using the identified commands of the target platform with the functionality within the threshold degree of similarity of the commands of the source platform. Additionally, the method comprises adapting a script from the source platform to be utilized in the target platform using the generated one or more alternative commands.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
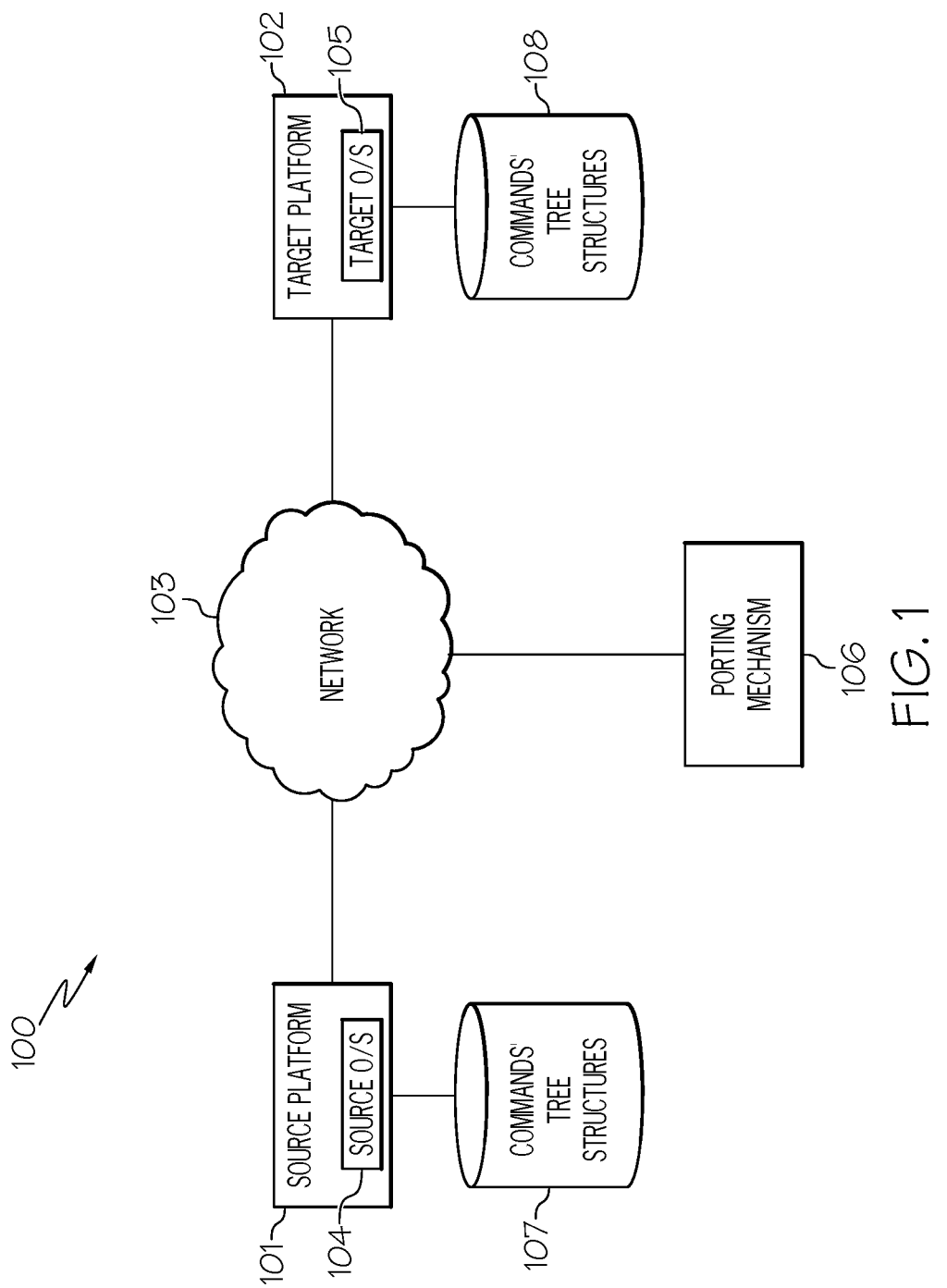
FIG. 1 illustrates a communication system for practicing the principles of the present disclosure in accordance with an embodiment of the present disclosure.

As stated in the Background section, in software engineering, porting is the process of adapting software for the purpose of achieving some form of execution in a computing environment that is different from the one that a given program was originally designed for execution (e.g., different CPU, operating system, or third party library).

When porting software, such as open-source tools, across different operating systems (e.g., Linux®, iOS®, Unix®, etc.) and/or hardware platforms (e.g., x86, Arm®, etc.), many scripts from a source platform need to be modified in order to be executed successfully on a target platform. A script refers to a program or sequence of instructions that is interpreted or carried out by another program rather than by the computer processor. A platform refers to the hardware and software (operation system) on which software applications can be run. A source platform refers to the platform upon which the scripts were originally designed for execution. A target platform refers to the platform upon which the scripts are desired to be executed.

For example, the script for a BATS (Bash Automated Testing System) framework in a source platform, such as the Linux® platform, may not be supported by the target platform (e.g., z/OS®). For instance, the commands of the script for the BATS framework may be not supported by the target platform. If the target platform does not report errors or warnings regarding unsupported commands, then the user will have no knowledge of such unsupported commands. As a result, the user may spend enormous time in attempting to identify the reasons for the script not executing on the target platform as well as spend enormous time in modifying the script in order to be properly executed on the target platform.

Unfortunately, there is not currently a means for informing the user regarding unsupported commands. Neither is there a means for automatically modifying the scripts from the source platform in order to be correctly executed on the target platform.

The embodiments of the present disclosure provide a means for adapting scripts from a source platform (e.g., Linux®) to be utilized in a target platform (e.g., z/OS®) when porting, such as porting open-source tools, by analyzing system call traces of commands from the source and target platforms to identify building blocks. A "system call," as used herein, is the programmatic way in which a computer program requests a service from the operating system on which it is executed. A "system call trace," as used herein, refers to the specialized use of logging to record information about the system call. A "building block," as used herein, refers to a portion of the script that contains functionality for performing task-based operations. For example, such task-based operations may include creating a service requirement, registering for an event, etc. Furthermore, building blocks typically contain one or more application programming interfaces (APIs). Such building blocks may be combined to perform the task-based operations of a command (e.g., reading a configuration file, copying files, moving and renaming files, creating empty files, etc.). A tree structure (hierarchical structure that is used to represent and organize the building blocks performing the task-based operations of the command) for each command of the source and target platforms is constructed with one or more building blocks of the identified building blocks. In one embodiment, the building blocks used to construct the command's tree structure are identified by analyzing the command's system call traces. Commands of the target platform with a functionality within a threshold degree of similarity as the commands of the source platform are identified by analyzing the building blocks of the tree structures of the commands of the source and target platforms. Alternative commands for the commands of the source platform, such as those commands that are not supported by the target platform, may then be generated using such identified commands. The script from the source platform may then be adapted to be utilized in the target platform using such generated alternative commands. For example, the script from the source platform may be adapted by replacing commands in the script that are not supported by the target platform with alternative commands that are supported by the target platform. For instance, a command from the script of the source platform that is mismatched (command used in the source platform with an appearance to a command used in the target platform but with a different functionality) or missing (command used in the source platform with the same functionality as a command from the target platform but with a different appearance) may be replaced with such a generated alternative command thereby enabling the script of the source platform to be adapted to be executed on the target platform. A further description of these and other features will be provided below.

In some embodiments of the present disclosure, the present disclosure comprises a computer-implemented method, system, and computer program product for adapting scripts from a source platform to be utilized in a target platform when porting. In one embodiment of the present disclosure, traces of system calls from the commands in the source and target platforms are analyzed to identify building blocks. A "system call," as used herein, is the programmatic way in which a computer program requests a service from the operating system on which it is executed. A "system call trace," as used herein, refers to the specialized use of logging to record information about the system call. A "building block," as used herein, refers to a portion of the script that contains functionality for performing task-based operations. A tree structure for each command of the source and target platforms is constructed with one or more building blocks from the identified building blocks. In one embodiment, such tree structures are constructed by analyzing the commands' system call traces. Commands of the target platform with a functionality within a threshold degree of similarity, which may be user-designated, to the commands of the source platform are identified by analyzing the building blocks of the commands' tree structures. In one embodiment, such similarity between the commands of the source and target platforms are determined by vectorizing the building blocks of the commands, including the actions, parameters, inputs, functions, etc. of the building blocks. After being converted into real-valued vectors, a similarity measure, such as cosine similarity or the Euclidean distance, may be used to determine the similarity between the commands of the source and target platforms. Alternative commands for the commands of the source platform, such as those commands that are not supported by the target platform, may then be generated using such identified commands. The script from the source platform may then be adapted to be utilized in the target platform using such generated alternative commands. For example, the script from the source platform may be adapted by replacing commands in the script that are not supported by the target platform with alternative commands that are supported by the target platform. For instance, a command from the script of the source platform that is mismatched (command used in the source platform with an appearance to a command used in the target platform but with a different functionality) or missing (command used in the source platform with the same functionality as a command from the target platform but with a different appearance) may be replaced with such a generated alternative command thereby enabling the script of the source platform to be adapted to be executed on the target platform. In this manner, scripts from a source platform with commands that are not supported by the target platform may now be adapted in a manner that enables such scripts to be executed on the target platform.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a source platform 101 connected to a target platform 102 via a network 103. A "platform," as used herein, refers to the hardware and software (operation system) on which software applications can be run. A "source platform" 101, as used herein, refers to the platform upon which the scripts were originally designed for execution. A "target platform" 102, as used herein, refers to the platform upon which the scripts are desired to be executed. A "script," as used herein, refers to a program or sequence of instructions that is interpreted or carried out by another program rather than by the computer processor.

Furthermore, in one embodiment, each platform, source platform 101 and target platform 102, includes an operating system, such as source operating system (o/s) 104 and target operating system (o/s) 105, respectively. Operating systems 104, 105 correspond to a program that, after being initially loaded into platform 101, 102, respectively, manages all of the other application programs in platform 101, 102, respectively. Such application programs make use of the operating system 104, 105 by making requests for services through defined application programming interfaces (APIs).

As discussed above, when porting software, such as open-source tools, scripts from source platform 101 may not be supported by target platform 102. For instance, the commands of the script from source platform 101 may not be supported by target platform 102. A command, as used herein, refers to an action assigned to a program (e.g., script) to perform a specific task. As a result, the script from source platform 101 may need to be adapted to be utilized in target platform 102 when porting, such as porting open-source tools. In one embodiment, porting mechanism 106 is configured to adapt scripts from source platform 101 to be utilized in target platform 102 as discussed below.

As shown in FIG. 1, porting mechanism 106 is connected to network 103. In one embodiment, porting mechanism 106 is configured to adapt scripts from source platform 101 to be utilized in target platform 102 by analyzing traces of system call traces from commands in source and target platforms 101, 102 to identify building blocks. A "system call," as used herein, is the programmatic way in which a computer program requests a service from the operating system on which it is executed. For example, commands from the script from source platform 101 may request a service from operating system 104. In another example, commands from the script to be utilized in target platform 102 may request a service from operating system 105.

A "system call trace," as used herein, refers to the specialized use of logging to record information about the system call. A "building block," as used herein, refers to a portion of the script that contains functionality for performing task-based operations. For example, such task-based operations may include creating a service requirement, registering for an event, etc. Furthermore, building blocks typically contain one or more application programming interfaces (APIs). Such building blocks may be combined to perform the task-based operations of a command (e.g., reading configuration files, copying files, moving and renaming files, creating empty files, etc.).

In one embodiment, porting mechanism 106 constructs a tree structure for each command of source and target platforms 101, 102 with one or more of the building blocks of the identified building blocks. A tree structure, as used herein, refers to a hierarchical structure that is used to represent and organize the building blocks performing the task-based operations of the command. In one embodiment, the building blocks used to construct the command's tree structure are identified by analyzing the command's system call traces.

In one embodiment, porting mechanism 106 is configured to refine the command's tree structure by categorizing the build blocks as being "trivial" or "critical" based on the relatedness to the key or main function of the command. The category of "trivial," as used herein, refers to building blocks with little value or importance in accomplishing the key or main function of the command and do not need to be utilized when identifying commands of target platform 102 with a functionality within a threshold degree of similarity as commands of source platform 101. The category of "crucial," as used herein, refers to building blocks of great importance in accomplishing the key or main function of the command and need to be utilized when identifying commands of target platform 102 with a functionality within a threshold degree of similarity as commands of source platform 101. In one embodiment, such building blocks are categorized as being "trivial" or "critical" based on weights assigned to the building blocks. For example, a weight of 1 or less assigned to a building block indicates categorizing such a building block as being trivial; whereas, assigning a weight of greater than 1 (e.g., 3) indicates categorizing such a building block as being critical. In one embodiment, the value of the weight assigned to such building blocks is based on the degree of relatedness to the key or main function of the command.

In one embodiment, the tree structures of commands, including such refined tree structures that include the categorized and/or weighted building blocks, are stored in databases. For example, the tree structures of commands pertaining to the scripts from source platform 101 are stored in database 107 connected to source platform 101. In another example, the tree structures of commands pertaining to the scripts to be utilized in target platform 102 are stored in database 108 connected to target platform 102.

In one embodiment, porting mechanism 106 is configured to identify commands of target platform 102 with a functionality within a threshold degree of similarity to commands of source platform 101 by analyzing the building blocks of commands' tree structures for those commands categorized as critical and/or with a weight that exceeds a threshold value, which may be user-designated. In one embodiment, such an analysis may simply be based on the building blocks classified as critical. In another embodiment, such an analysis may simply be based on the building blocks with a weight that exceeds a user-designated threshold value.

In one embodiment, porting mechanism 106 labels each command of source platform 101 and/or target platform 102 with the designation of "same," "mismatch," or "missing" based on comparing the building blocks for each command of target platform 102 with the building blocks of commands of source platform 101. The designation of "same," as used herein, refers to a command of source platform 101 or target platform 102 that has an appearance and a functionality within a threshold degree of similarity of a command of target platform 101 or source platform 101, respectively. The designation of "mismatch," as used herein, refers to a command of source platform 101 or target platform 102 that has an appearance within a threshold degree of similarity of a command of target platform 102 or source platform 101, respectively, but does not have a functionality within a threshold degree of similarity of the command of target platform 102 or source platform 101, respectively. The designation of "missing," as used herein, refers to a command of source platform 101 or target platform 102 that has a functionality within a threshold degree of similarity of a command of target platform 102 or source platform 101, respectively, but does not have an appearance within a threshold degree of similarity of the command of target platform 102 or source platform 101, respectively. The designations of "mismatch" and "missing" are indications of commands, such as the commands of source platform 101, that are not supported by target platform 102.

In one embodiment, porting mechanism 106 generates, if possible, alternative commands for the commands of source platform 102 labeled as mismatch and/or missing. For example, the command of "mktemp" (the mktemp command declares an explicit file or directory that is meant to be temporary) of source platform 101 (e.g., Linux®) is classified as "missing" since such a command does not have a command with a functionality within a threshold degree of similarity of a command of target platform 102 (e.g., z/OS®). However, the command of "mktemp" does have an alternative command that was generated by porting mechanism 106, such as the combination of the "mkdir" and "head/dev/urandom" commands of target platform 102. As a result, the script from source platform 101 may be adapted to be utilized in target platform 102 by replacing the "mktemp" command in the script for source platform 101 with the combined commands of "mkdir" and "head/dev/urandom" of target platform 102.

In another example, the command of "stat -c" (the stat -c command gives information about the file and filesystem) of source platform 101 (e.g., Linux®) is classified as "mismatch" since such a command does not have a command with an appearance within a threshold degree of similarity of a command of target platform 102 (e.g., z/OS®). However, the command of "stat-c" does have an alternative command that was generated by porting mechanism 106, such as the "ls -l" command (command used to list files and directories) of target platform 102, since the "ls -l" command returns the same information as the information returned by "stat -c." As a result, the script from source platform 101 may be adapted to be utilized in target platform 102 by replacing the "stat -c" command in the script for source platform 101 with the command of "ls -l" of target platform 102.

Hence, in one embodiment, porting mechanism 106 is configured to adapt scripts from source platform 101 to be utilized in target platform 102 by using such generated alternative commands.

A more detailed description of these and other features will be provided further below. Furthermore, a description of the software components of porting mechanism 106 used for adapting scripts from a source platform to be utilized in a target platform when porting is provided below in connection with FIG. 2. A description of the hardware configuration of porting mechanism 106 is provided further below in connection with FIG. 10.

As discussed above, porting mechanism 106 is connected to network 103.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 is not to be limited in scope to any one particular network architecture. System 100 may include any number of source platforms 101, target platforms 102, networks 103, porting mechanisms 106, and databases 107, 108.

A discussion regarding the software components used by porting mechanism 106 to adapt scripts from a source platform to be utilized in a target platform when porting is provided below in connection with FIG. 2.

Figure 2:
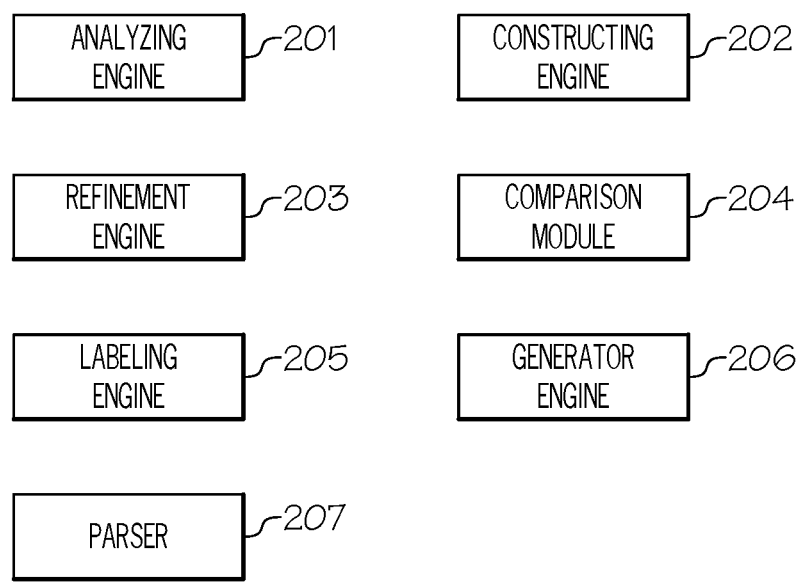
FIG. 2 is a diagram of the software components used by the porting mechanism to adapt scripts from a source platform to be utilized in a target platform when porting in accordance with an embodiment of the present disclosure.

FIG. 2 is a diagram of the software components used by porting mechanism 106 (FIG. 1) to adapt scripts from a source platform (e.g., source platform 101) to be utilized in a target platform (e.g., target platform 102) when porting in accordance with an embodiment of the present disclosure.

As shown in FIG. 2, porting mechanism 106 includes an analyzing engine 201 configured to analyze traces of system calls from commands in source and target platforms 101, 102 to identify building blocks.

As discussed above, a "system call," as used herein, is the programmatic way in which a computer program requests a service from the operating system on which it is executed. For example, commands from the script from source platform 101 may request a service from operating system 104. In another example, commands from the script to be utilized in target platform 102 may request a service from operating system 105.

A "system call trace," as used herein, refers to the specialized use of logging to record information about the system call. A "building block," as used herein, refers to a portion of the script that contains functionality for performing task-based operations. For example, such task-based operations may include creating a service requirement, registering for an event, etc. Furthermore, building blocks typically contain one or more application programming interfaces (APIs). Such building blocks may be combined to perform the task-based operations of a command (e.g., reading configuration files, copying files, moving and renaming files, creating empty files, etc.).

In one embodiment, analyzing engine 201 traces system calls via the use of tracing tools, which can include, but are not limited to, strace, dtruss, Jaeger, Zipkin, Dynatrace®, etc.

Figure 3:
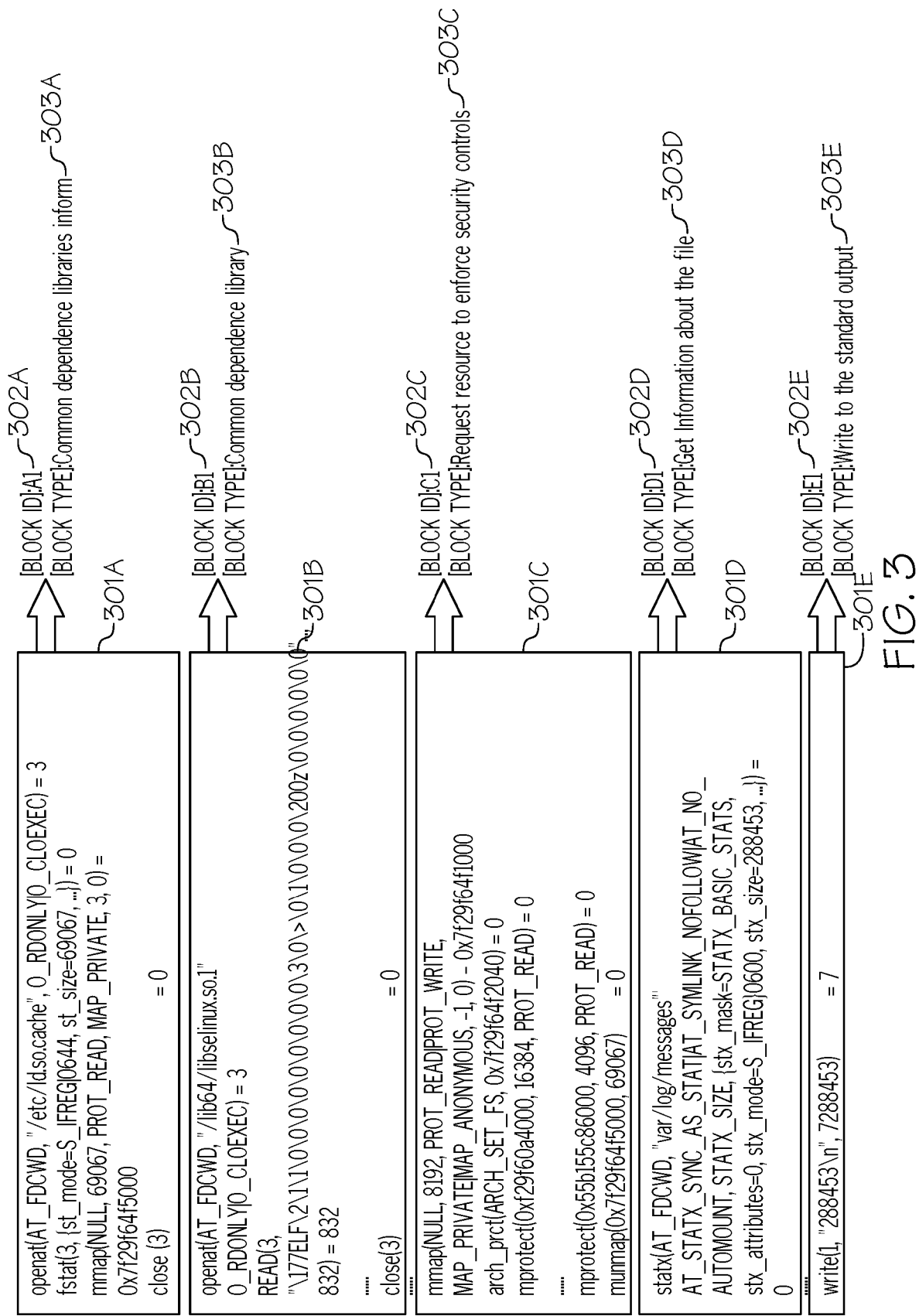
FIG. 3 illustrates identifying building blocks based on analyzing the system call traces of commands from source and target platforms in accordance with an embodiment of the present disclosure.

In one embodiment, analyzing engine 201 analyzes such traces to identify building blocks based on identifying functions (e.g., openat( ), mmap( ), statx( ), write( ), etc.), where the lines of code of the function correspond to the building block as illustrated in FIG. 3. In one embodiment, analyzing engine 201 identifies the functions in the system call traces based on identifying terms listed in a data structure (e.g., table) corresponding to functions to be identified in the system call traces. For example, such a data structure may include the terms of "openat( )," "mmap( )," "statx( )," "write( )," etc. corresponding to functions to be identified in the system call traces. In one embodiment, such a data structure resides within the storage device of porting mechanism 106. In one embodiment, such a data structure is populated by an expert.

Referring now to FIG. 3, FIG. 3 illustrates identifying building blocks based on analyzing the system call traces of commands from source and target platforms 101, 102 in accordance with an embodiment of the present disclosure.

As shown in FIG. 3, analyzing engine 201 identifies the functions (e.g., openat( ), mmap( ), statx( ), write( ), etc.)

used in the system call traces of commands from source platform 101 (e.g., Linux® platform). For instance, analyzing engine 201 identified the function openat( ) (opens the file named by the path) corresponding to building block ID ("Block ID"): A1 (see element 302A), where the lines of code for such an identified function correspond to the building block, such as building block 301A. In one embodiment, analyzing engine 201 generates an identifier ("Block ID") for each building block identified. In one embodiment, the type of building block ("Block Type") for each identified building block is identified by analyzing engine 201 based on the identified function and the input or parameter of the identified function listed within the parenthesis of the function. For example, the building block type for building block 301A corresponds to having the common dependence libraries inform (see element 303A). In one embodiment, analyzing engine 201 determines such information based on identifying the function in the data structure (e.g., table) containing a listing of functions that are associated with various building block types. Furthermore, such a data structure may include an identification of the building block type based on the input or parameters within the parenthesis of the function. As a result, analyzing engine 201 is able to identify the building block type based on identifying the input or parameters within the parenthesis of the identified function. In one embodiment, such a data structure resides within the storage device of porting mechanism 106. In one embodiment, such a data structure is populated by an expert.

Other examples include analyzing engine 201 identifying the function openat( ) corresponding to building block ID ("Block ID"): B1 (see element 302B), where the lines of code for such an identified function correspond to the building block, such as building block 301B. Furthermore, analyzing engine 201 identifies the building block type for building block 301B as corresponding to a common dependence library (see element 303B).

In another example, analyzing engine 201 identifies the function mmap( ) (creates a new mapping in the virtual address space) corresponding to building block ID ("Block ID"): C1 (see element 302C), where the lines of code for such an identified function correspond to the building block, such as building block 301C. Furthermore, analyzing engine 201 identifies the building block type for building block 301C as corresponding to requesting a resource to enforce security controls (see element 303C).

In a further example, analyzing engine 201 identifies the function statx( ) (identifies the target file) corresponding to building block ID ("Block ID"): D1 (see element 302D), where the lines of code for such an identified function correspond to the building block, such as building block 301D. Furthermore, analyzing engine 201 identifies the building block type for building block 301D as corresponding to getting information about the file (see element 303D).

In another example, analyzing engine 201 identifies the function write( ) (creates a communication line) corresponding to building block ID ("Block ID"): E1 (see element 302E), where the lines of code for such an identified function correspond to the building block, such as building block 301E. Furthermore, analyzing engine 201 identifies the building block type for building block 301E as corresponding to writing to the standard output (see element 303E).

Furthermore, porting mechanism 106 includes a constructing engine 202 configured to construct a tree structure for each command of source and target platforms 101, 102 with one or more building blocks from the building blocks identified by analyzing engine 201.

In one embodiment, constructing engine 202 constructs such tree structures by analyzing the commands' system call traces.

For example, in one embodiment, constructing engine 202 analyzes the particular command's system call trace to identify the building blocks out of the building blocks identified by analyzing engine 201 based on identifying functions (e.g., openat( ), mmap( ), statx( ), write( ), etc.), where the lines of code of the function correspond to the building blocks. In one embodiment, analyzing engine 201 identifies the functions in the system call traces based on identifying terms listed in a data structure (e.g., table) corresponding to functions to be identified in the system call traces. For example, such a data structure may include the terms of "openat( )," "mmap( )," "statx( )," "write( )," etc. corresponding to functions to be identified in the system call traces. In one embodiment, such a data structure resides within the storage device of porting mechanism 106. In one embodiment, such a data structure is populated by an expert.

In one embodiment, tree structures are constructed based on such analysis of the particular command's system call trace based on determining the dependencies among the building blocks. Such dependencies, as used herein, refer to relationships between the building blocks, such as the functions of the building blocks, where one building block relies on the other to work properly. In one embodiment, such dependencies are obtained using various dependency analysis tools, which can include, but are not limited to, MathWorks® (e.g., matlab.codetools.requiredFilesandProducts function), DepAn, slizaa, Softagram®, etc.

In one embodiment, based on such dependencies, a tree structure of such dependencies (parent-child relationships) is constructed by constructing engine 202. A tree structure, as used herein, refers to a hierarchical structure that is used to represent and organize the building blocks performing the task-based operations of the command. In such a hierarchical structure, the nodes in a tree structure represent the building blocks identified from analyzing the particular command's system call trace. Each node in the tree structure has zero or more child nodes, which are located beneath it in the tree structure. A node that has a child is called the child's parent node. All nodes have exactly one parent, except the topmost root node, which has none. An illustration of such a tree structure is shown in FIG. 4.

Figure 4:
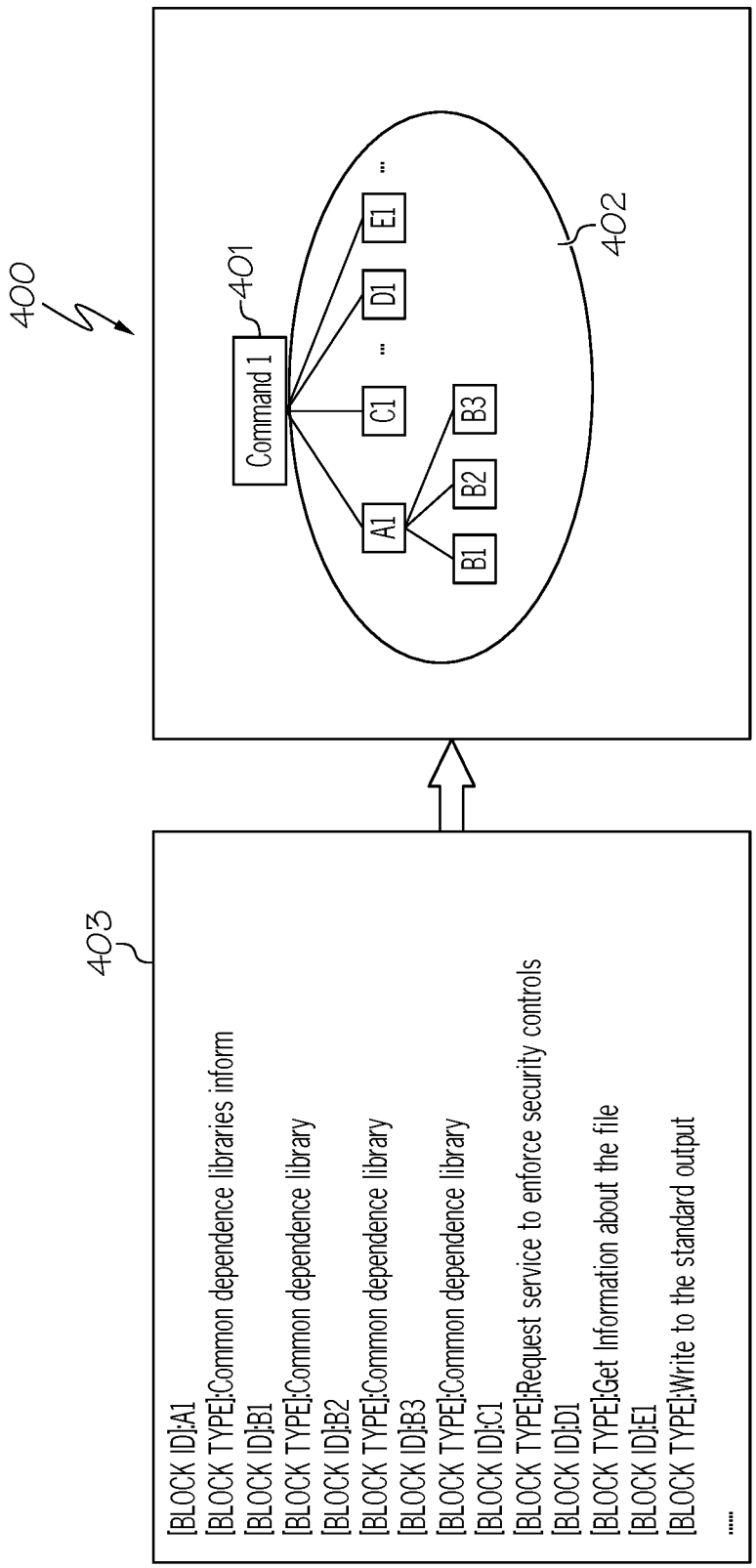
FIG. 4 illustrates a tree structure representing the dependencies among the identified building blocks by analyzing the command's system call trace in accordance with an embodiment of the present disclosure.

FIG. 4 illustrates a tree structure 400 representing the dependencies among the identified building blocks by analyzing the command's system call trace in accordance with an embodiment of the present disclosure.

As shown in FIG. 4, tree structure 400 is constructed for a command 401 (e.g., command 1) based on the dependencies among the building blocks 402, such as building blocks A1, B1, B2, B3, C1, D1, E1 and so forth as shown in FIG. 4.

As further illustrated in FIG. 4, tree structure 400 is constructed based on building blocks 402 whose corresponding block identifiers ("Block ID") and building block types ("Block Type") are shown in table 403. As illustrated in table 403, building blocks (e.g., B1, B2, and B3) with the building block type of having a common dependence library are the child nodes to the building block (e.g., A1) with the building block type corresponding to having the common dependence libraries inform. Such dependencies are illustrated in tree structure 400 by having building blocks B1, B2, and B3 be the child nodes to building block A1.

Returning to FIG. 2, in conjunction with FIGS. 1 and 3-4, in one embodiment, constructing engine 202 is configured to construct a tree structure for each command of source and target platforms 101, 102 with one or more building blocks from the building blocks identified by analyzing engine 201 based on the determined dependencies among the building blocks using various software tools, which can include, but are not limited to, Graphviz®, Mermaid, Nomnoml, etc.

Porting mechanism 106 additionally includes a refinement engine 203 configured to refine the command's tree structure (e.g., tree structure 400) by categorizing the building blocks of tree structure 400 as being trivial or critical based on the relatedness to the key or main function of the command. The category of "trivial," as used herein, refers to building blocks with little value or importance in accomplishing the key or main function of the command and do not need to be utilized when identifying commands of target platform 102 with a functionality within a threshold degree of similarity as the commands of source platform 101. The category of "crucial," as used herein, refers to building blocks of great importance in accomplishing the key or main function of the command and need to be utilized when identifying commands of target platform 102 with a functionality within a threshold degree of similarity as the commands of source platform 101. In one embodiment, such building blocks are categorized as being "trivial" or "critical" based on weights assigned to the building blocks. For example, a weight of 1 or less assigned to a building block indicates categorizing such a building block as being trivial; whereas, assigning a weight of greater than 1 (e.g., 3) indicates categorizing such a building block as being critical. In one embodiment, the value of the weight assigned to such building blocks is based on the degree of relatedness to the key or main function of the command.

Figure 5:
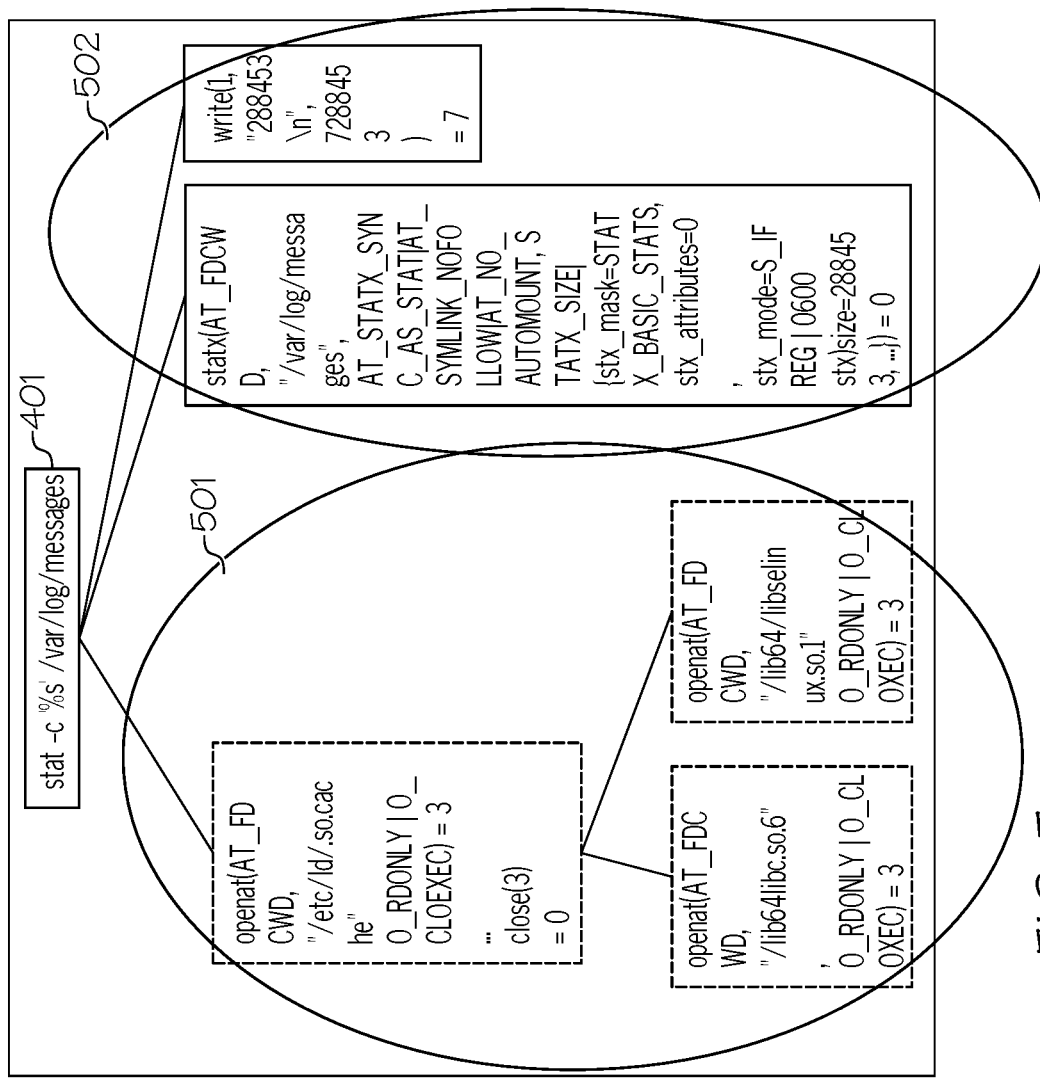
FIG. 5 illustrates categorizing the building blocks of the tree structure for a command of the source platform or the target platform as being trivial or critical based on the relatedness to the key or main function of the command in accordance with an embodiment of the present disclosure.
Figure 5:
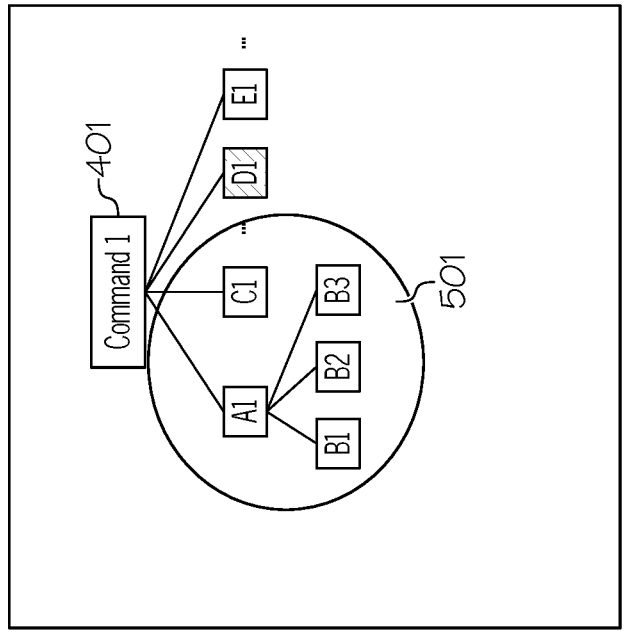

In one embodiment, refinement engine 203 categorizes the building blocks of tree structure 400 based on determining the relatedness to the key or main function of the command. In one embodiment, the key or main function of the command is determined based on identifying the key or main function (e.g., provide information about the file and filesystem) of the command (e.g., stat -c) listed in a data structure (e.g., table). For example, such a data structure may include the key or main function of "providing information about the file and filesystem" corresponding to the stat -c command. Furthermore, in such a data structure, the key or main function may be associated with other functions that are of great importance for implementing such a key or main function, such as write( ), statx( ), etc. Upon identifying such functions from the data structure, refinement engine 203 attempts to identify such functions associated with the building blocks of tree structure 400. Upon identifying such functions in the building blocks of tree structure 400, such building blocks are classified as being "critical," whereas, the other building blocks are classified as being "trivial" as shown in FIG. 5. In one embodiment, such a data structure resides within the storage device of porting mechanism 106. In one embodiment, such a data structure is populated by an expert.

FIG. 5 illustrates categorizing the building blocks of tree structure 400 for a command (e.g., command 401) of source platform 101 or target platform 102 as being trivial or critical based on the relatedness to the key or main function of the command in accordance with an embodiment of the present disclosure.

Referring to FIG. 5, building blocks 501 have been identified as being trivial since such functions associated with such building blocks of tree structure 400 are of little value or importance in accomplishing the key or main function of the command. FIG. 5 further illustrates that building blocks 502 have been identified as critical since such building blocks are of great importance in accomplishing the key or main function of the command. In one embodiment, the functions (e.g., statx( ), write( )) of such building blocks 502 may have been identified in a data structure as being of great importance for implementing the key or main function of command 401. As a result, such building blocks 502 are identified as being critical.

Furthermore, building blocks 402 of command 401 as shown in FIG. 4 may, in addition or alternatively to being classified as being "trivial" or "critical" as discussed above, be assigned a weight based on the relatedness to the key or main function of command 401. In one embodiment, the key or main function of the command is determined based on identifying the key or main function (e.g., provide information about the file and filesystem) of the command (e.g., stat -c) listed in a data structure (e.g., table). For example, such a data structure may include the key or main function of "providing information about the file and filesystem" corresponding to the stat -c command. Furthermore, in such a data structure, the key or main function may be associated with various functions that are of varying degrees of importance for implementing the key or main function. Such varying degrees of importance may be identified via an assigned weight to such a function, where the lower the value of the weight, the less important is the function for implementing the key or main function of command 401 and vice-versa. In one embodiment, such a data structure resides within the storage device of porting mechanism 106. In one embodiment, such a data structure is populated by an expert. An example of assigning each command's building blocks an appropriate weight, such as using the data structure discussed above, is illustrated in FIG. 6.

Figure 6:
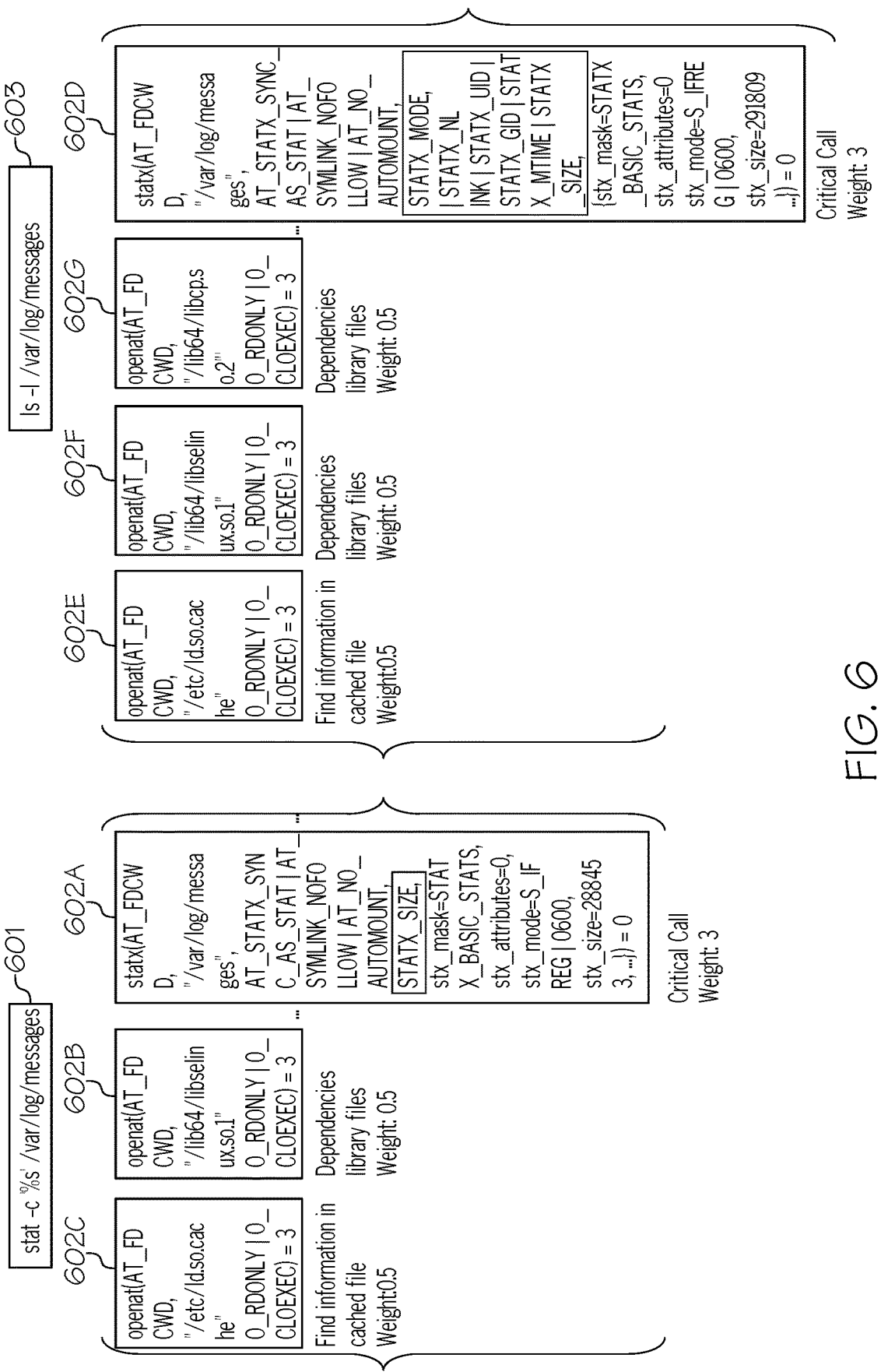
FIG. 6 illustrates assigning the building blocks of a command's tree structure with a weight based on the relatedness to the key or main function of the command in accordance with an embodiment of the present disclosure.

FIG. 6 illustrates assigning the building blocks of a command's tree structure with a weight based on the relatedness to the key or main function of the command in accordance with an embodiment of the present disclosure.

Referring to FIG. 6, FIG. 6 illustrates assigning weights to the building blocks of command 601 (e.g., stat -c '%s'/var/log/messages) from source platform 101. For instance, the openat( ) function may be of little importance to implementing the key or main function of command 601 (e.g., stat -c); whereas, the statx( ) function may be of great importance to implementing the key or main function of command 601 (stat -c). As a result, a higher weight (e.g., 3) may be assigned to building block 602A associated with the function of statx( ) and a lower weight (e.g., 0.5) may be assigned to the building blocks 602B-602C associated with the function of openat( ).

FIG. 6 further illustrates assigning weights to the building blocks of command 603 (e.g., ls -l/var/log/messages) from target platform 102. For instance, the openat( ) function may be of little importance to implementing the key or main function of command 603 (e.g., ls -l); whereas, the statx( ) function may be of great importance to implementing the key or main function of command 603 (e.g., ls -l). As a result, a higher weight (e.g., 3) may be assigned to building block 602D associated with the function of statx( ) and a lower weight (e.g., 0.5) may be assigned to the building blocks 602E-602G associated with the function of openat( ).

Referring to FIG. 2, in conjunction with FIGS. 1 and 3-6, porting mechanism 106 additionally includes a comparison module 204 configured to identify commands of target platform 102 with a functionality within a threshold degree of similarity, which may be user-designated, to the commands of source platform 101 by analyzing the building blocks of the commands' tree structures 400 for those commands categorized as critical and/or with a weight that exceeds a threshold value.

In one embodiment, such similarity between the commands of source platform 101 and target platform 102 may be determined by vectorizing the building blocks of the commands, including the actions, parameters, inputs, functions, etc. of the building blocks, such as via Word2vec, Doc2Vec, GloVe, etc. After being converted into real-valued vectors, a similarity measure, such as cosine similarity or the Euclidean distance, may be used to determine the similarity between the commands of source platform 101 and target platform 102. Such a similarity measure is compared to a threshold value, which may be user-designated, to determine if the commands are within a threshold degree of similarity to one another. If the similarity measure exceeds such a threshold value, then the commands are deemed to be within a threshold degree of similarity. Otherwise, the commands are not deemed to be within the threshold degree of similarity.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the commands are deemed to be within a threshold degree of similarity. Otherwise, the commands are not deemed to be within the threshold degree of similarity.

In one embodiment, the Euclidean distance is calculated as the square root of the sum of the squared differences between the two feature vectors. If the distance exceeds a threshold value, which may be user-designated, then the commands are deemed to be within a threshold degree of similarity. Otherwise, the commands are not deemed to be within the threshold degree of similarity.

In one embodiment, the similarity measure is a score between the values of 0 and 1 for vectors that have only positive values. In one embodiment, any negative scores can be made positive by taking its absolute value.

Comparison module 204 utilizes various software tools for generating the similarity score, which can include, but are not limited to, TensorFlow®, MathWorks®, plus sklearn, scikit-learn®, etc.

Figure 7:
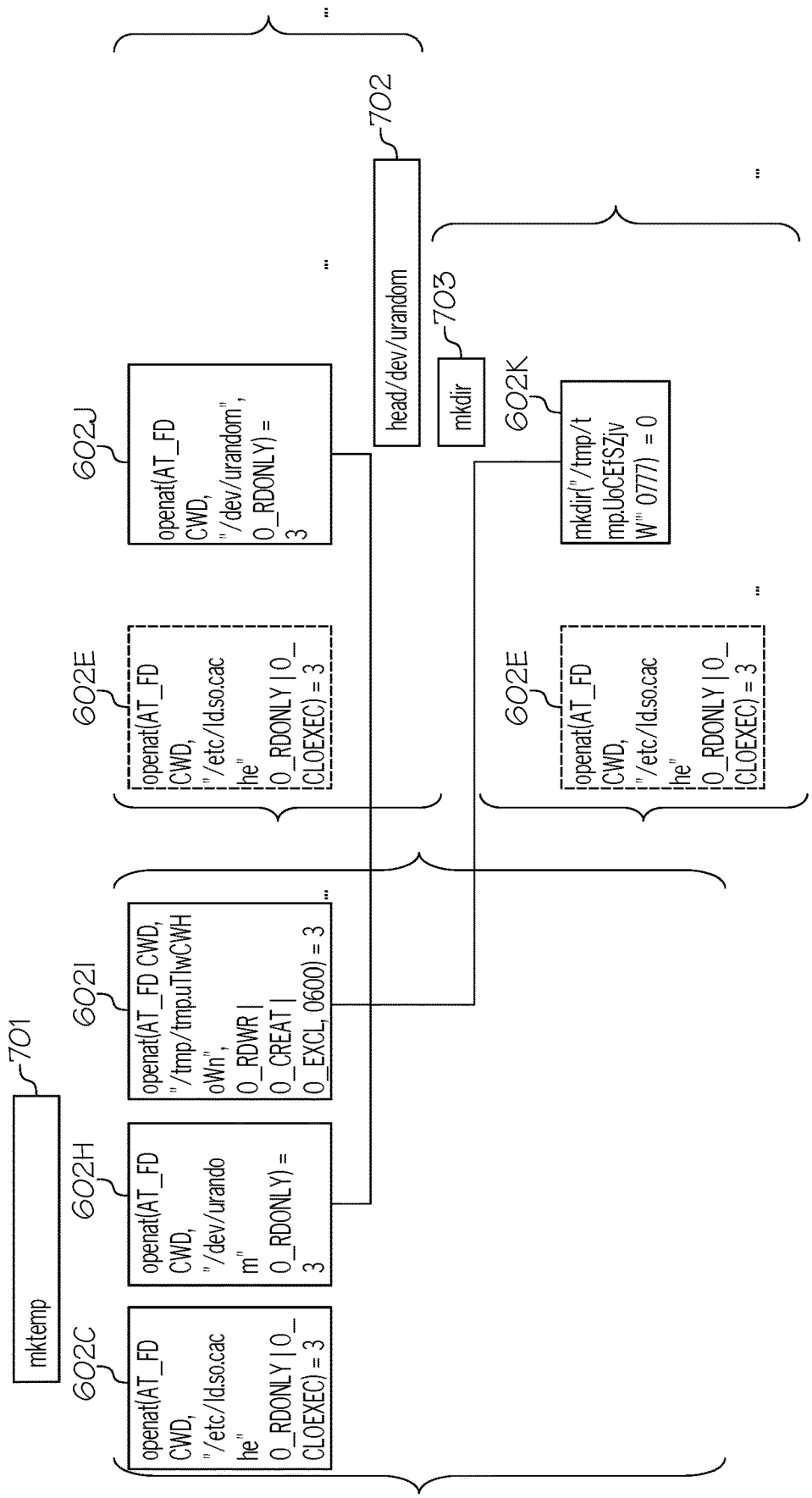
FIG. 7 illustrates identifying a command(s) of the target platform or source platform with a functionality within a threshold degree of similarity to a command(s) of the source platform or target platform, respectively, in accordance with an embodiment of the present disclosure.

An illustration of comparison module 204 identifying a command(s) of source platform 101 or target platform 102 with a functionality within a threshold degree of similarity to a command(s) of target platform 102 or source platform 101, respectively, by analyzing the building blocks of the commands' tree structures 400 for those command categorized as critical and/or with a weight that exceeds a threshold value is provided in FIG. 7.

FIG. 7 illustrates identifying a command(s) (e.g., mktemp) of source platform 101 (e.g., Linux® platform) or target platform 102 with a functionality within a threshold degree of similarity to a command(s) of target platform 102 (e.g., z/OS®) or source platform 101, respectively, in accordance with an embodiment of the present disclosure.

As shown in FIG. 7, the mktemp command 701 of source platform 101 has a functionality within a threshold degree of similarity to the combination of the head/dev/urandom command 702 and mkdir command 703 of target platform 102 (e.g., z/OS®). As illustrated in FIG. 7, the mktemp command 701 includes building blocks 602C, 602H, and 602I, which together have a functionality within the threshold degree of similarity to the combination of the head/dev/urandom command 702 and mkdir command 703 of target platform 102 (e.g., z/OS®). As further illustrated in FIG. 7, the head/dev/urandom command 702 includes building blocks 602E, and 602J and the mkdir command 703 includes building blocks 602E, and 602K.

Figure 8:
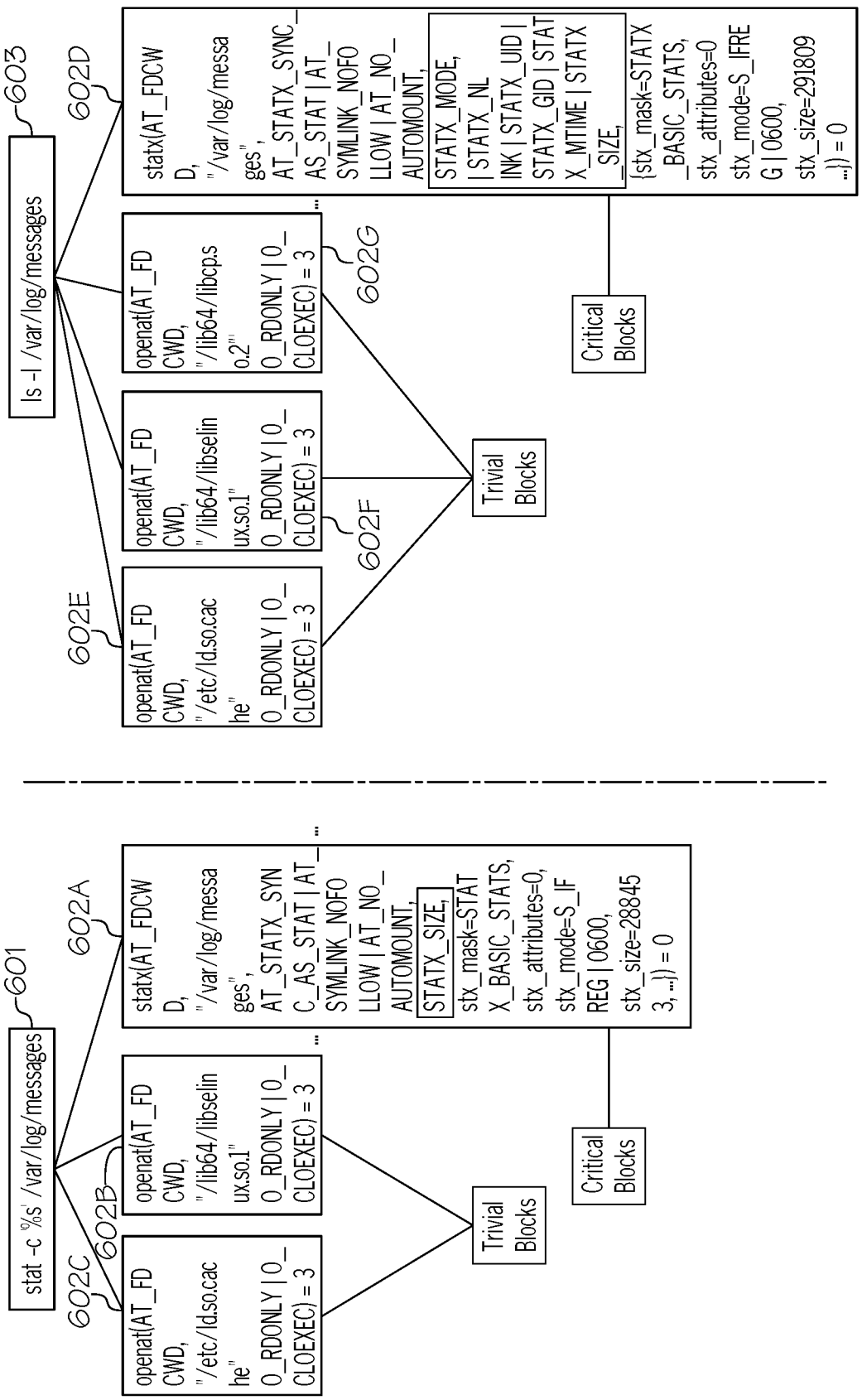
FIG. 8 illustrates a further example of the comparison module identifying a command(s) of the target platform or source platform with a functionality within a threshold degree of similarity to a command(s) of the source platform or target platform, respectively, in accordance with an embodiment of the present disclosure.

Another example of identifying a command(s) of source platform 101 or target platform 102 with a functionality within a threshold degree of similarity to a command(s) of target platform 102 or source platform 101, respectively, is provided in FIG. 8.

FIG. 8 illustrates a further example of comparison module 204 identifying a command(s) (e.g., stat -c '% s'/var/log/messages) of source platform 101 (e.g., Linux® platform) or target platform 102 with a functionality within a threshold degree of similarity to a command(s) (e.g., ls -l/var/log/messages) of target platform 102 (e.g., z/OS®) or source platform, respectively, in accordance with an embodiment of the present disclosure.

As shown in FIG. 8, the stat -c command 601 of source platform 101 has a functionality within a threshold degree of similarity to the ls -l command 603 of target platform 102 (e.g., z/OS®). As illustrated in FIG. 8, the stat -c command 601 (e.g., stat -c '% s'/var/log/messages) includes building blocks 602A, 602B, and 602C, which together have a functionality within the threshold degree of similarity to the ls -l command 603 (e.g., ls -l/var/log/messages), which includes building blocks 602D, 602E, 602F, and 602G. For example, the information returned by the ls -l command 603 of target platform 102 corresponds to the information returned by the stat-c command 601 of source platform 101.

Referring to FIG. 2, in conjunction with FIGS. 1 and 3-8, porting mechanism 106 additionally includes a labeling engine 205 configured to label each command of source platform 101 and/or target platform 102 with the designation of "same," "mismatch," or "missing" based on comparing the building blocks for each command of target platform 102 with the building blocks of commands of source platform 101. The designation of "same," as used herein, refers to a command of source platform 101 or target platform 102 that has an appearance and a functionality within a threshold degree of similarity of a command of target platform 101 or source platform 101, respectively. The designation of "mismatch," as used herein, refers to a command of source platform 101 or target platform 102 that has an appearance within a threshold degree of similarity of a command of target platform 102 or source platform 101, respectively, but does not have a functionality within a threshold degree of similarity of the command of target platform 102 or source platform 101, respectively. The designation of "missing," as used herein, refers to a command of source platform 101 or target platform 102 that has a functionality within a threshold degree of similarity of a command of target platform 102 or source platform 101, respectively, but does not have an appearance within a threshold degree of similarity of the command of target platform 102 or source platform 101, respectively. The designations of "mismatch" and "missing" are indications of commands, such as the commands of source platform 101, that are not supported by target platform 102.

In one embodiment, comparison engine 204 determines whether the appearance of the command of source platform 101 and/or target platform 102 is within a threshold degree of similarity to the appearance of the command of target platform 102 and/or source platform 101, respectively, based on vectorizing the commands of source and target platforms 101, 102. After being converted into real-valued vectors, a similarity measure, such as cosine similarity or the Euclidean distance, may be used to determine the similarity between the appearance of the commands of source platform 101 and target platform 102. Such a similarity measure is compared to a threshold value, which may be user-designated, to determine if the appearance of the commands are within a threshold degree of similarity to one another. If the similarity measure exceeds such a threshold value, then the appearance of the commands are deemed to be within a threshold degree of similarity. Otherwise, the appearance of the commands are not deemed to be within the threshold degree of similarity.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the appearance of the commands are deemed to be within a threshold degree of similarity. Otherwise, the appearance of the commands are not deemed to be within the threshold degree of similarity.

In one embodiment, the Euclidean distance is calculated as the square root of the sum of the squared differences between the two feature vectors. If the distance exceeds a threshold value, which may be user-designated, then the appearance of the commands are deemed to be within a threshold degree of similarity. Otherwise, the appearance of the commands are not deemed to be within the threshold degree of similarity.

In one embodiment, the similarity measure is a score between the values of 0 and 1 for vectors that have only positive values. In one embodiment, any negative scores can be made positive by taking its absolute value.

Comparison engine 204 utilizes various software tools for generating the similarity score, which can include, but are not limited to, TensorFlow®, Math Works®, plus sklearn, scikit-learn®, etc.

In one embodiment, comparison engine 204 determines whether the functionality of the command of source platform 101 and/or target platform 102 is within a threshold degree of similarity to the functionality of the command of target platform 102 and/or source platform 101, respectively, based on vectorizing the commands of source and target platforms 101, 102 by vectorizing the building blocks of the commands, including the actions, parameters, inputs, functions, etc. of the building blocks, such as via Word2vec, Doc2Vec, GloVe, etc. After being converted into real-valued vectors, a similarity measure, such as cosine similarity or the Euclidean distance, may be used to determine the similarity between the functionality of the commands of source platform 101 and target platform 102. Such a similarity measure is compared to a threshold value, which may be user-designated, to determine if the functionality of the commands are within a threshold degree of similarity to one another. If the similarity measure exceeds such a threshold value, then the functionality of the commands are deemed to be within a threshold degree of similarity. Otherwise, the functionality of the commands are not deemed to be within the threshold degree of similarity.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the functionality of the commands are deemed to be within a threshold degree of similarity. Otherwise, the functionality of the commands are not deemed to be within the threshold degree of similarity.

In one embodiment, the Euclidean distance is calculated as the square root of the sum of the squared differences between the two feature vectors. If the distance exceeds a threshold value, which may be user-designated, then the functionality of the commands are deemed to be within a threshold degree of similarity. Otherwise, the functionality of the commands are not deemed to be within the threshold degree of similarity.

In one embodiment, the similarity measure is a score between the values of 0 and 1 for vectors that have only positive values. In one embodiment, any negative scores can be made positive by taking its absolute value.

Comparison module 204 utilizes various software tools for generating the similarity score, which can include, but are not limited to, TensorFlow®, MathWorks®, plus sklearn, scikit-learn®, etc.

Figure 9:
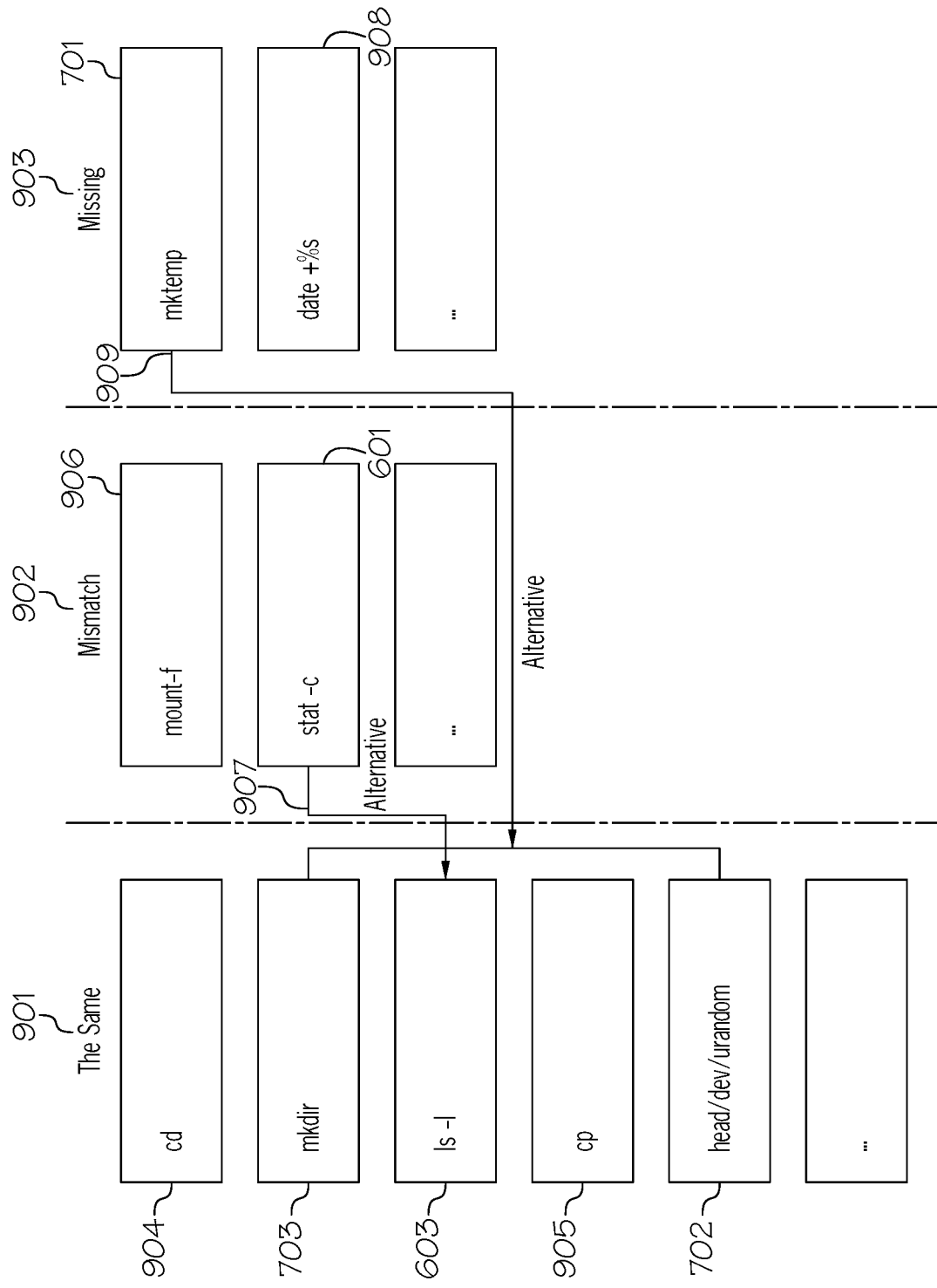
FIG. 9 illustrates labeling each command of the source platform and/or the target platform with the designation of "same," "mismatch," or "missing" based on comparing the building blocks for the source and target platforms in accordance with an embodiment of the present disclosure.

Based on the findings of comparison module 204 as to whether the commands of source platform 101 and/or target platform 102 have an appearance and functionality within the threshold degree of similarity of the commands of target platform 102 and/or source platform 101, respectively, labeling engine 205 labels such commands of source platform 101 appropriately (e.g., "same," "mismatch," or "missing") as illustrated in FIG. 9.

FIG. 9 illustrates labeling each command of source platform 101 and/or target platform 102 (e.g., z/OS® platform) with the designation of "same," "mismatch," or "missing" based on comparing the building blocks for source and target platforms 101, 102 in accordance with an embodiment of the present disclosure.

As shown in FIG. 9, the commands of source platform 101/target platform 102 are labeled as "same" 901, "mismatch" 902 and "missing" 903. As illustrated in FIG. 9, the commands of cd 904, mkdir 703, ls -l 603, cp 905, and head/dev/urandom 702 of target platform 102 are labeled as "same" 901 since such commands have an appearance and functionality within the threshold degree of similarity of the commands of source platform 101.

As further illustrated in FIG. 9, the commands of mount-f 906 and stat -c 601 of source platform 101 (e.g., Linux® platform) are labeled as mismatch 902 since such commands have an appearance within a threshold degree of similarity of a command of target platform 102 but does not have a functionality within a threshold degree of similarity of the command of target platform 102. FIG. 9 further illustrates an alternative command for performing the command of stat -c 601 of source platform 101, which corresponds to the ls -l command 603 of target platform 102 as shown via arrow 907.

Furthermore, as illustrated in FIG. 9, the commands of mktemp 701 and date +% s 908 of source platform 101 (e.g., Linux® platform) are labeled as missing 903 as such commands have a functionality within a threshold degree of similarity of a command of target platform 102 but do not have an appearance within a threshold degree of similarity of the command of target platform 102. FIG. 9 further illustrates an alternative command for performing the command of mktemp 701 of source platform 101, which corresponds to the combination of the mkdir 703 and head/dev/urandom 702 commands of target platform 102 as shown via arrow 909.

Returning to FIG. 2, in conjunction with FIGS. 1 and 3-9, porting mechanism 106 additionally includes a generator engine 206 configured to generate, if possible, alternative commands for the commands of source platform 101 labeled as mismatch and/or missing. In one embodiment, generator engine 206 generates such alternative commands based on the commands of target platform 102 identified by comparison module 204 as having a functionality within a threshold degree of similarity, which may be user-designated, to the commands of source platform 101. For example, comparison module 204 may have identified the command of ls -l 603 from target platform 102 as having the same functionality (or within a threshold degree of similarity) as the command of stat -c 601 as identified by arrow 907 in FIG. 9. In another example, comparison module 204 may have identified the commands of mkdir 703 and head/dev/urandom 702 from target platform 102 as having the same functionality (or within a threshold degree of similarity) as the command of mktemp 701 as identified by arrow 909 in FIG. 9. As a result of identifying such alternative commands by comparison module 204, generator engine 206 generates, if possible, alternative commands for the commands of source platform 101 labeled as mismatch and/or missing.

For example, referring to FIG. 9, the command of stat -c 601 of source platform 101 is identified as being classified as mismatch 902. Since comparison module 204 identified an alternative command (e.g., ls -l 603) of target platform 102 for the command of stat -c 601 of source platform 101, as illustrated by arrow 907 of FIG. 9, such an alternative command is generated by generator engine 206. In another example, the command of mktemp 701 of source platform 101 is identified as being classified as missing 903 as shown in FIG. 9. Since comparison module 204 identified an alternative command (e.g., combination of the commands of mkdir 703 and head/dev/urandom 702) of target platform 102 for the command of mktemp 701 of source platform 101, as illustrated by arrow 909, such an alternative command is generated by generator engine 206.

Generator engine 206 is further configured to adapt the script from source platform 101 to be utilized in target platform 102 by using such generated alternative commands. For example, as discussed above, the command of mktemp 701 of source platform 101 (e.g., Linux®) is classified as "missing" since such a command does not have a command with a functionality within a threshold degree of similarity of a command of target platform 102 (e.g., z/OS®). However, the command of mktemp 701 does have an alternative command that was generated by generator engine 206, such as the combination of the mkdir 703 and head/dev/urandom 702 commands of target platform 102. As a result, generator engine 206 adapts the script from source platform 101 to be utilized in target platform 102 by replacing the command of mktemp 701 in the script for source platform 101 with the combined commands of mkdir 703 and head/dev/urandom 702 of target platform 102.

In another example, the command of stat -c 601 of source platform 101 (e.g., Linux®) is classified as "mismatch" since such a command does not have a command with an appearance within a threshold degree of similarity of a command of target platform 102 (e.g., z/OS®). However, the command of stat -c 601 does have an alternative command that was generated by generator engine 206, such as the command of ls -l 603 of target platform 102 which returns the same information as the information returned by the stat -c command 601. As a result, generator engine 206 adapts the script from source platform 101 to be utilized in target platform 102 by replacing the stat -c command 601 in the script for source platform 101 with the command of ls -l 603 of target platform 102.

In this manner, scripts from a source platform (e.g., Linux®) which contain commands unsupported by a target platform (e.g., z/OS®) are adapted to be utilized in the target platform (e.g., z/OS®) when porting, such as porting open-source tools.

A further discussion regarding adapting scripts from source platform 101 to be utilized in target platform 102 by replacing commands that are unsupported by the target platform with alternative commands that are supported by the target platform is provided below.

Referring again to FIG. 2, in conjunction with FIGS. 1 and 3-9, porting mechanism 106 includes a parser 207 configured to parse an incoming script from source platform 101 line by line.

"Parsing," as used herein, refers to analyzing and breaking down a sequence of input symbols or tokens into its component parts to determine its structure and meaning. Examples of parser 207 performing such parsing can include, but are not limited to, ANTLR®, Bison, Lemon, Lex, Parboiled, Ragel, XPL, etc.

Upon parsing the incoming script, comparison module 204 identifies a command in the parsed script, such as for the recent line of the incoming script that was parsed.

In one embodiment, comparison module 204 is configured to identify a command in the parsed script based on matching the name of a command (e.g., stat -c) in the parsed script with a listing of commands in a data structure (e.g., table) for various platforms, including both source and target platforms 101, 102. In one embodiment, such a data structure resides within the storage device of porting mechanism 106. In one embodiment, such a data structure is populated by an expert.

Upon identifying a command in the parsed script, generator engine 206 of porting mechanism 106 determines whether the identified command is labeled the "same" 901.

For example, as discussed above, labeling engine 205 labels various commands with the designations of "same," "mismatch," or "missing." In one embodiment, generator engine 206 accesses a data structure (e.g., table) with information as shown in FIG. 9 that was populated by labeling engine 205. In one embodiment, such a data structure resides within the storage device of porting mechanism 106. Upon locating the command identified in such a data structure, generator engine 206 determines if such a command is labeled under the category of "same" 901.

If the identified command is labeled with the designation of "same," then generator engine 206 writes the line of script from the parsed incoming script with the identified command in the output script for target platform 102.

If, however, the identified command is not identified as being labeled with the designation of "same," then such an identified command is identified as being either "mismatch" or "missing." As a result, if the identified command is not identified as being labeled with the designation of "same," then generator engine 206 of porting mechanism 106 determines whether there are any alternative commands for the commands of source platform 101 that are labeled as "mismatch" or "missing."

As discussed above, labeling engine 205 labels various commands with the designations of "same," "mismatch," or "missing." In one embodiment, generator engine 206 accesses a data structure (e.g., table) with information as shown in FIG. 9 that was populated by labeling engine 205. Upon locating the command identified in such a data structure, generator engine 206 determines if such a command is labeled under the category of "mismatch" 902 or "missing" 903. Upon identifying the command labeled as "mismatch" 902 or "missing" 903, generator engine 206 determines if such a command has an alternative command that was identified by comparison module 204, where such information (e.g., information such as shown by arrows 907, 909 in FIG. 9) was stored in a data structure (e.g., table) populated by labeling engine 205. As a result, generator engine 206 performs a look-up of such a data structure to identify any alternative command for the command identified.

If there is not an alternative command for the identified command, then generator engine 206 inserts a warning message in the output script for target platform 102 that the command is labeled as mismatch or missing but with no generated alternative commend.

If, however, there is an alternative command, then generator engine 206 replaces the command from the line of script in the parsed incoming script with the generated alternative command and writes the line of script from the parsed incoming script with the replaced command in the output script for target platform 102. For example, the command of stat -c 601 in the incoming script of source platform 101 is replaced with the alternative command of ls -l 603 as shown in FIG. 9, where the line of script from the parsed incoming script with such a replacement is then written to the output script for target platform 102.

In one embodiment, generator engine 206 utilizes various software tools for writing lines of code in the output script, inserting warning messages in the output script, replacing commands in the incoming script with alternative commands to be written to the output script, etc., which can include, but are not limited to, UltraEdit®, Xcode®, CodeLite, Emacs®, Vim®, etc.

Furthermore, in one embodiment, upon parsing each of the lines in the incoming script from source platform 101 and performing such tasks as discussed above, the output script is ready to be issued to target platform 102 to be executed on target platform 102.

A further description of these and other features is provided below in connection with the discussion of the method for adapting scripts from a source platform to be utilized in a target platform during porting.

Prior to the discussion of the method for adapting scripts from a source platform to be utilized in a target platform during porting, a description of the hardware configuration of porting mechanism 106 (FIG. 1) is provided below in connection with FIG. 10.

Figure 10:
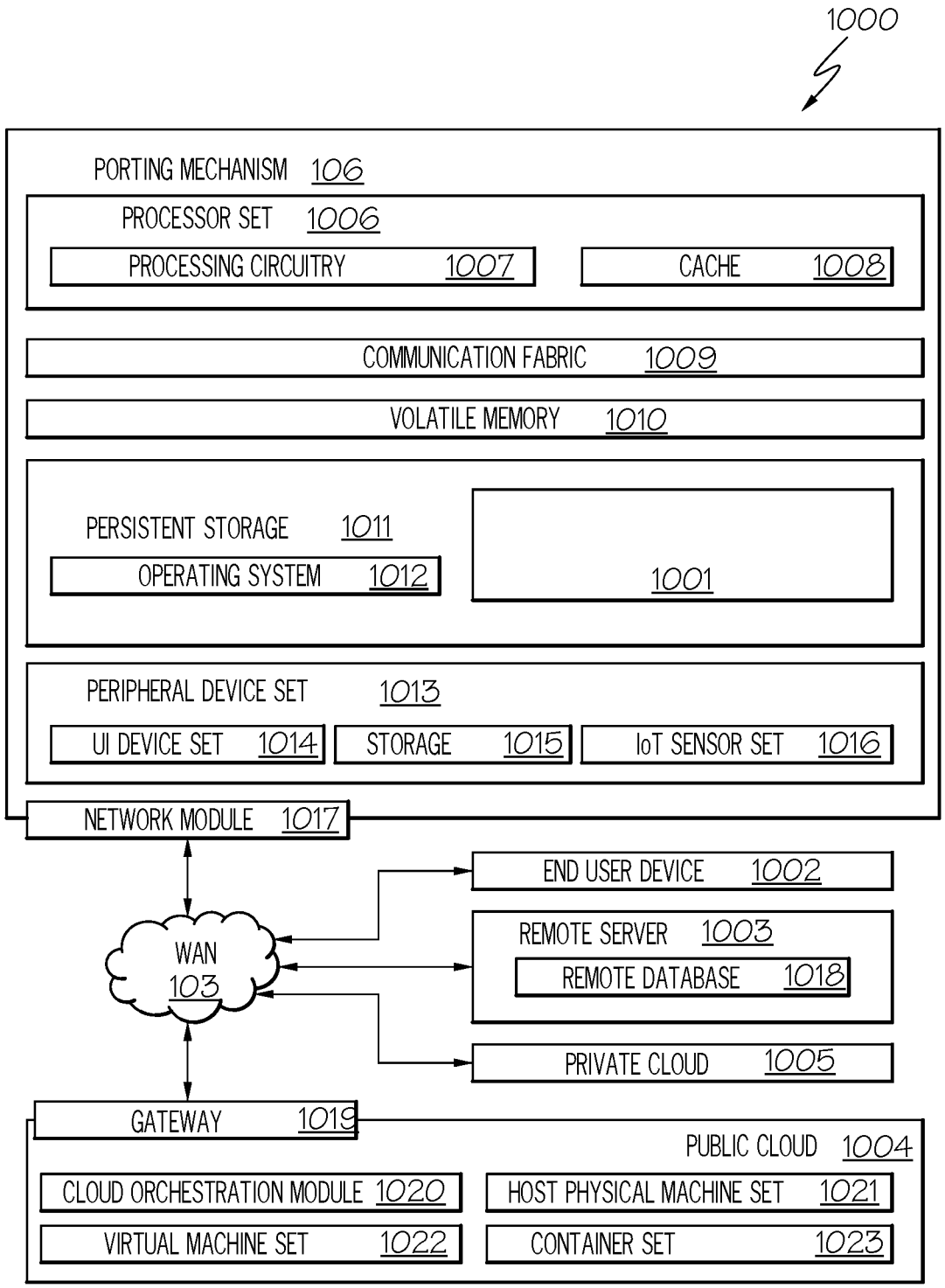
FIG. 10 illustrates an embodiment of the present disclosure of the hardware configuration of the porting mechanism which is representative of a hardware environment for practicing the present disclosure.

Referring now to FIG. 10, in conjunction with FIG. 1, FIG. 10 illustrates an embodiment of the present disclosure of the hardware configuration of porting mechanism 106 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code 1001 involved in performing the inventive methods, such as adapting scripts from a source platform to be utilized in a target platform during porting. In addition to block 1001, computing environment 1000 includes, for example, porting mechanism 106, network 103, such as a wide area network (WAN), end user device (EUD) 1002, remote server 1003, public cloud 1004, and private cloud 1005. In this embodiment, porting mechanism 106 includes processor set 1006 (including processing circuitry 1007 and cache 1008), communication fabric 1009, volatile memory 1010, persistent storage 1011 (including operating system 1012 and block 1001, as identified above), peripheral device set 1013 (including user interface (UI) device set 1014, storage 1015, and Internet of Things (IoT) sensor set 1016), and network module 1017. Remote server 1003 includes remote database 1018. Public cloud 1004 includes gateway 1019, cloud orchestration module 1020, host physical machine set 1021, virtual machine set 1022, and container set 1023.

Porting mechanism 106 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1018. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically porting mechanism 106, to keep the presentation as simple as possible. Porting mechanism 106 may be located in a cloud, even though it is not shown in a cloud in FIG. 10.

On the other hand, porting mechanism 106 is not required to be in a cloud except to any extent as may be affirmatively indicated.

Processor set 1006 includes one, or more, computer processors of any type now known or to be developed in the future. Processing circuitry 1007 may be distributed over multiple packages, for example, multiple, coordinated integrated circuit chips. Processing circuitry 1007 may implement multiple processor threads and/or multiple processor cores. Cache 1008 is memory that is located in the processor chip package(s) and is typically used for data or code that should be available for rapid access by the threads or cores running on processor set 1006. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto porting mechanism 106 to cause a series of operational steps to be performed by processor set 1006 of porting mechanism 106 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1008 and the other storage media discussed below. The program instructions, and associated data, are accessed by processor set 1006 to control and direct performance of the inventive methods. In computing environment 1000, at least some of the instructions for performing the inventive methods may be stored in block 1001 in persistent storage 1011.

Communication fabric 1009 is the signal conduction paths that allow the various components of porting mechanism 106 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1010 is any type of volatile memory now known or to be developed in the future. Examples include dynamic type random access memory (RAM) or static type RAM. Typically, the volatile memory is characterized by random access, but this is not required unless affirmatively indicated. In porting mechanism 106, the volatile memory 1010 is located in a single package and is internal to porting mechanism 106, but, alternatively or additionally, the volatile memory may be distributed over multiple packages and/or located externally with respect to porting mechanism 106.

Persistent Storage 1011 is any form of non-volatile storage for computers that is now known or to be developed in the future. The non-volatility of this storage means that the stored data is maintained regardless of whether power is being supplied to porting mechanism 106 and/or directly to persistent storage 1011. Persistent storage 1011 may be a read only memory (ROM), but typically at least a portion of the persistent storage allows writing of data, deletion of data and re-writing of data. Some familiar forms of persistent storage include magnetic disks and solid state storage devices. Operating system 1012 may take several forms, such as various known proprietary operating systems or open source Portable Operating System Interface type operating systems that employ a kernel. The code included in block 1001 typically includes at least some of the computer code involved in performing the inventive methods.

Peripheral device set 1013 includes the set of peripheral devices of porting mechanism 106. Data communication connections between the peripheral devices and the other components of porting mechanism 106 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1014 may include components such as a display screen, speaker, microphone, wearable devices (such as goggles and smart watches), keyboard, mouse, printer, touchpad, game controllers, and haptic devices. Storage 1015 is external storage, such as an external hard drive, or insertable storage, such as an SD card. Storage 1015 may be persistent and/or volatile. In some embodiments, storage 1015 may take the form of a quantum computing storage device for storing data in the form of qubits. In embodiments where porting mechanism 106 is required to have a large amount of storage (for example, where porting mechanism 106 locally stores and manages a large database) then this storage may be provided by peripheral storage devices designed for storing very large amounts of data, such as a storage area network (SAN) that is shared by multiple, geographically distributed computers. IoT sensor set 1016 is made up of sensors that can be used in Internet of Things applications. For example, one sensor may be a thermometer and another sensor may be a motion detector.

Network module 1017 is the collection of computer software, hardware, and firmware that allows porting mechanism 106 to communicate with other computers through WAN 103. Network module 1017 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1017 are performed on the same physical hardware device. In other embodiments (for example, embodiments that utilize software-defined networking (SDN)), the control functions and the forwarding functions of network module 1017 are performed on physically separate devices, such that the control functions manage several different network hardware devices. Computer readable program instructions for performing the inventive methods can typically be downloaded to porting mechanism 106 from an external computer or external storage device through a network adapter card or network interface included in network module 1017.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1002 is any computer system that is used and controlled by an end user (for example, a customer of an enterprise that operates porting mechanism 106), and may take any of the forms discussed above in connection with porting mechanism 106. EUD 1002 typically receives helpful and useful data from the operations of porting mechanism 106. For example, in a hypothetical case where porting mechanism 106 is designed to provide a recommendation to an end user, this recommendation would typically be communicated from network module 1017 of porting mechanism 106 through WAN 103 to EUD 1002. In this way, EUD 1002 can display, or otherwise present, the recommendation to an end user. In some embodiments, EUD 1002 may be a client device, such as thin client, heavy client, mainframe computer, desktop computer and so on.

Remote server 1003 is any computer system that serves at least some data and/or functionality to porting mechanism 106. Remote server 1003 may be controlled and used by the same entity that operates porting mechanism 106. Remote server 1003 represents the machine(s) that collect and store helpful and useful data for use by other computers, such as porting mechanism 106. For example, in a hypothetical case where porting mechanism 106 is designed and programmed to provide a recommendation based on historical data, then this historical data may be provided to porting mechanism 106 from remote database 1018 of remote server 1003.

Public cloud 1004 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1004 is performed by the computer hardware and/or software of cloud orchestration module 1020. The computing resources provided by public cloud 1004 are typically implemented by virtual computing environments that run on various computers making up the computers of host physical machine set 1021, which is the universe of physical computers in and/or available to public cloud 1004. The virtual computing environments (VCEs) typically take the form of virtual machines from virtual machine set 1022 and/or containers from container set 1023. It is understood that these VCEs may be stored as images and may be transferred among and between the various physical machine hosts, either as images or after instantiation of the VCE. Cloud orchestration module 1020 manages the transfer and storage of images, deploys new instantiations of VCEs and manages active instantiations of VCE deployments. Gateway 1019 is the collection of computer software, hardware, and firmware that allows public cloud 1004 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1005 is similar to public cloud 1004, except that the computing resources are only available for use by a single enterprise. While private cloud 1005 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1004 and private cloud 1005 are both part of a larger hybrid cloud.

Block 1001 further includes the software components discussed herein in connection with FIGS. 2-9 to adapt scripts from a source platform to be utilized in a target platform during porting. In one embodiment, such components may be implemented in hardware. The functions discussed above performed by such components are not generic computer functions. As a result, porting mechanism 106 is a particular machine that is the result of implementing specific, non-generic computer functions.

In one embodiment, the functionality of such software components of porting mechanism 106, including the functionality for adapting scripts from a source platform to be utilized in a target platform during porting, may be embodied in an application specific integrated circuit.

As stated above, when porting software, such as open-source tools, across different operating systems (e.g., Linux®, iOS®, Unix®, etc.) and/or hardware platforms (e.g., x86, Arm®, etc.), many scripts from a source platform need to be modified in order to be executed successfully on a target platform. A script refers to a program or sequence of instructions that is interpreted or carried out by another program rather than by the computer processor. A platform refers to the hardware and software (operation system) on which software applications can be run. A source platform refers to the platform upon which the scripts were originally designed for execution. A target platform refers to the platform upon which the scripts are desired to be executed. For example, the script for a BATS (Bash Automated Testing System) framework in a source platform, such as the Linux® platform, may not be supported by the target platform (e.g., z/OS®). For instance, the commands of the script for the BATS framework may be not supported by the target platform. If the target platform does not report errors or warnings regarding unsupported commands, then the user will have no knowledge of such unsupported commands. As a result, the user may spend enormous time in attempting to identify the reasons for the script not executing on the target platform as well as spend enormous time in modifying the script in order to be properly executed on the target platform. Unfortunately, there is not currently a means for informing the user regarding unsupported commands. Neither is there a means for automatically modifying the scripts from the source platform in order to be correctly executed on the target platform.

Figure 11:
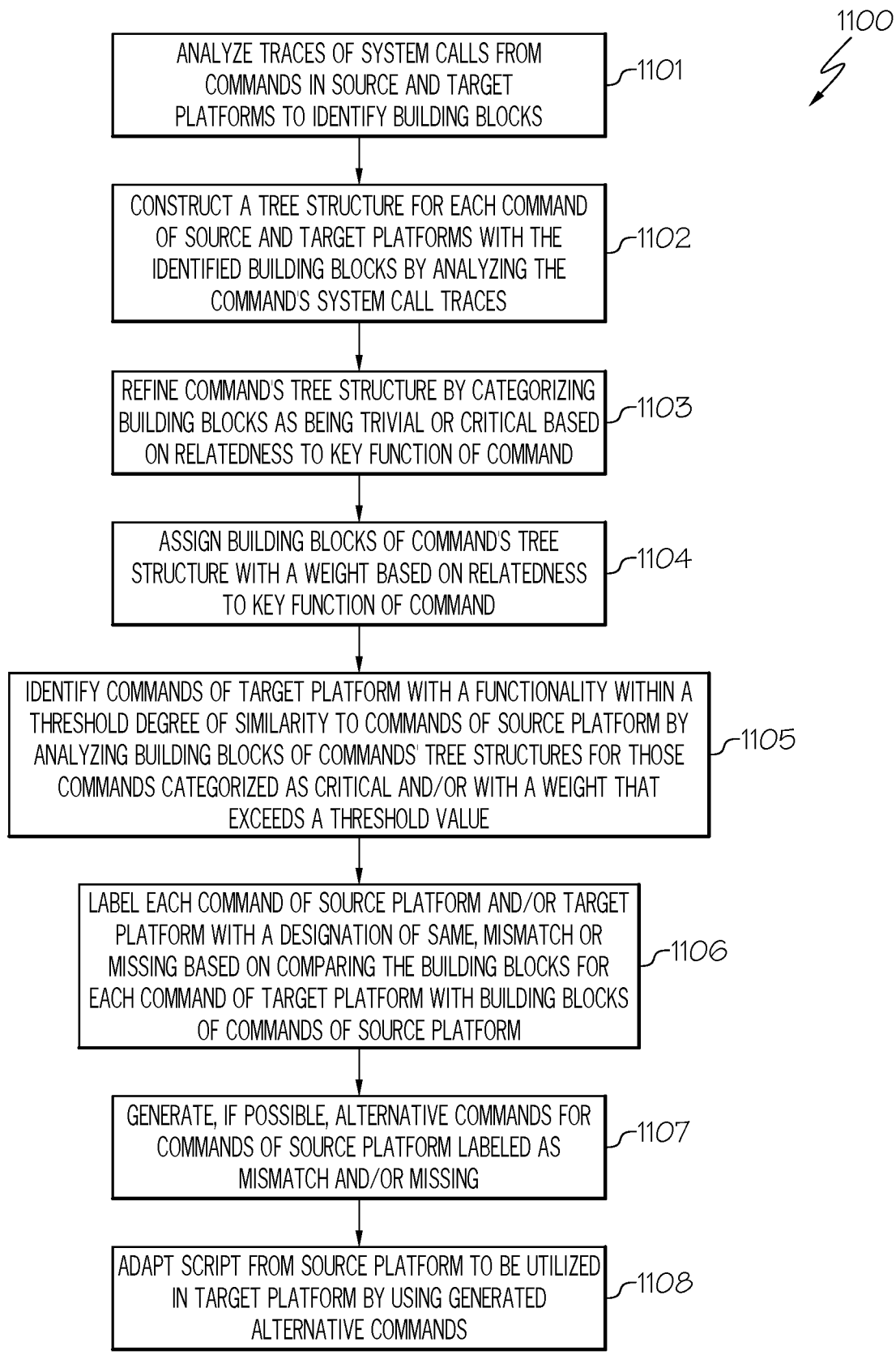
FIG. 11 is a flowchart of a method for adapting scripts from a source platform to be utilized in a target platform when porting in accordance with an embodiment of the present disclosure.
Figure 12:
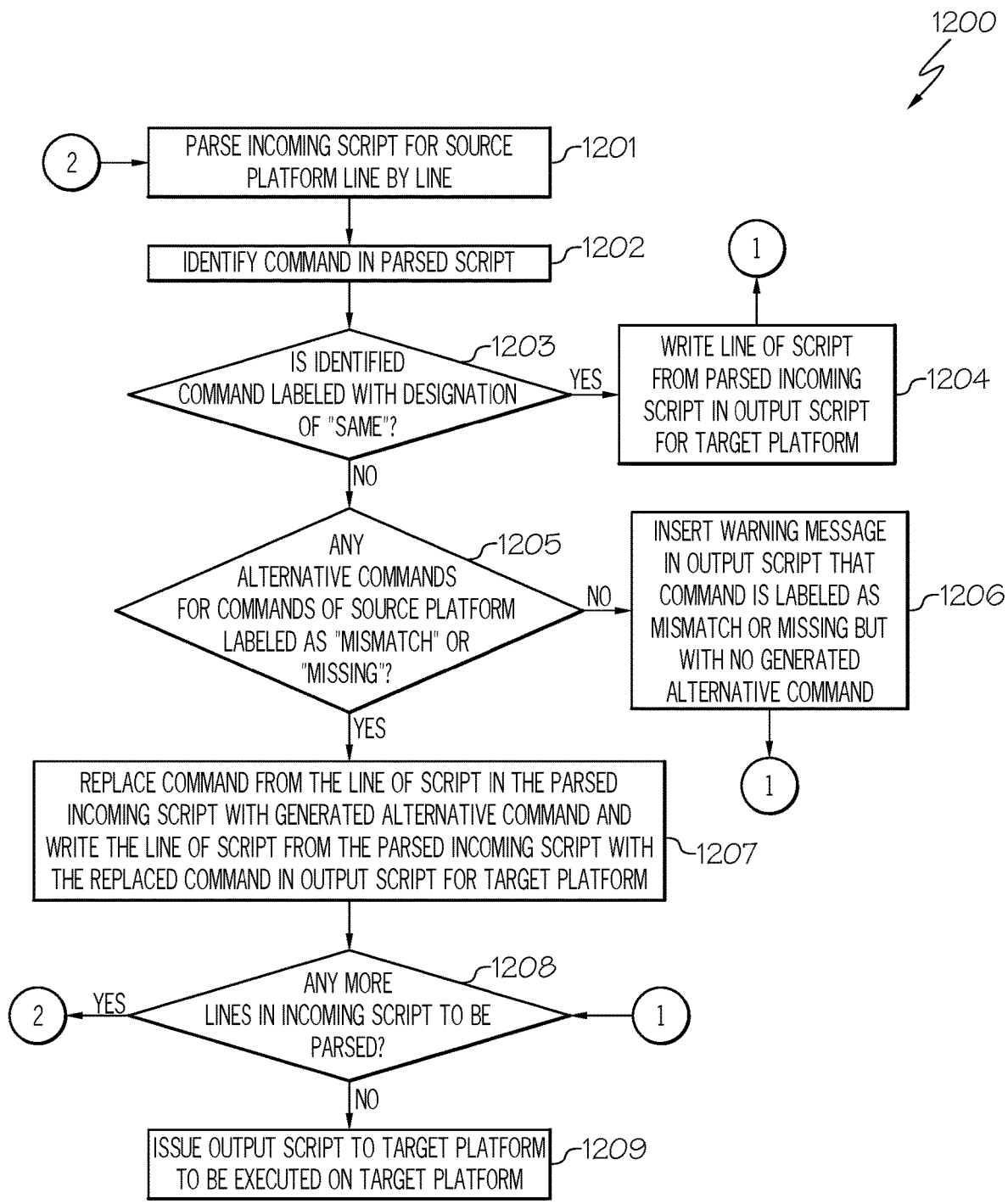
FIG. 12 is a flowchart of a method for adapting scripts from a source platform to be utilized in a target platform by replacing commands in the script for the source platform that are unsupported by the target platform with alternative commands that are supported by the target platform in accordance with an embodiment of the present disclosure.

The embodiments of the present disclosure provide a means for adapting scripts from a source platform (e.g., Linux®) to be utilized in a target platform (e.g., z/OS®) when porting, such as porting open-source tools, as discussed below in connection with FIGS. 11-12. FIG. 11 is a flowchart of a method for adapting scripts from a source platform (e.g., Linux®) to be utilized in a target platform (e.g., z/OS®) when porting. FIG. 12 is a flowchart of a method for adapting scripts from a source platform to be utilized in a target platform by replacing commands in the script for the source platform that are unsupported by the target platform with alternative commands that are supported by the target platform.

As stated above, FIG. 11 is a flowchart of a method 1100 for adapting scripts from a source platform (e.g., Linux®) to be utilized in a target platform (e.g., z/OS®) when porting in accordance with an embodiment of the present disclosure.

Referring to FIG. 11, in conjunction with FIGS. 1-10, in step 1101, analyzing engine 201 of porting mechanism 106 analyzes traces of system calls from commands in source and target platforms 101, 102 to identify building blocks.

As discussed above, a "system call," as used herein, is the programmatic way in which a computer program requests a service from the operating system on which it is executed. For example, commands from the script from source platform 101 may request a service from operating system 104. In another example, commands from the script to be utilized in target platform 102 may request a service from operating system 105.

A "system call trace," as used herein, refers to the specialized use of logging to record information about the system call. A "building block," as used herein, refers to a portion of the script that contains functionality for performing task-based operations. For example, such task-based operations may include creating a service requirement, registering for an event, etc. Furthermore, building blocks typically contain one or more application programming interfaces (APIs). Such building blocks may be combined to perform the task-based operations of a command (e.g., reading configuration files, copying files, moving and renaming files, creating empty files, etc.).

Furthermore, as discussed above, in one embodiment, analyzing engine 201 traces system calls via the use of tracing tools, which can include, but are not limited to, strace, dtruss, Jaeger, Zipkin, Dynatrace®, etc.

In one embodiment, analyzing engine 201 analyzes such traces to identify building blocks based on identifying functions (e.g., openat( ), mmap( ), statx( ), write( ), etc.), where the lines of code of the function correspond to the building block as illustrated in FIG. 3. In one embodiment, analyzing engine 201 identifies the functions in the system call traces based on identifying terms listed in a data structure (e.g., table) corresponding to functions to be identified in the system call traces. For example, such a data structure may include the terms of "openat( )," "mmap( )," "statx( )," "write( )," etc. corresponding to functions to be identified in the system call traces. In one embodiment, such a data structure resides within the storage device (e.g., storage device 1011, 1015) of porting mechanism 106. In one embodiment, such a data structure is populated by an expert.

Referring now to FIG. 3, analyzing engine 201 identifies the functions (e.g., openat( ), mmap( ), statx( ), write( ), etc.) used in the system call traces of commands from source platform 101 (e.g., Linux® platform). For instance, analyzing engine 201 identified the function openat( ) (opens the file named by the path) corresponding to building block ID ("Block ID"): A1 (see element 302A), where the lines of code for such an identified function correspond to the building block, such as building block 301A. In one embodiment, analyzing engine 201 generates an identifier ("Block ID") for each building block identified. In one embodiment, the type of building block ("Block Type") for each identified building block is identified by analyzing engine 201 based on the identified function and the input or parameter of the identified function listed within the parenthesis of the function. For example, the building block type for building block 301A corresponds to having the common dependence libraries inform (see element 303A). In one embodiment, analyzing engine 201 determines such information based on identifying the function in the data structure (e.g., table) containing a listing of functions that are associated with various building block types. Furthermore, such a data structure may include an identification of the building block type based on the input or parameters within the parenthesis of the function. As a result, analyzing engine 201 is able to identify the building block type based on identifying the input or parameters within the parenthesis of the identified function. In one embodiment, such a data structure resides within the storage device (e.g., storage device 1011, 1015) of porting mechanism 106. In one embodiment, such a data structure is populated by an expert.

Other examples include analyzing engine 201 identifying the function openat( ) corresponding to building block ID ("Block ID"): B1 (see element 302B), where the lines of code for such an identified function correspond to the building block, such as building block 301B. Furthermore, analyzing engine 201 identifies the building block type for building block 301B as corresponding to a common dependence library (see element 303B).

In another example, analyzing engine 201 identifies the function mmap( ) (creates a new mapping in the virtual address space) corresponding to building block ID ("Block ID"): C1 (see element 302C), where the lines of code for such an identified function correspond to the building block, such as building block 301C. Furthermore, analyzing engine 201 identifies the building block type for building block 301C as corresponding to requesting a resource to enforce security controls (see element 303C).

In a further example, analyzing engine 201 identifies the function statx( ) (identifies the target file) corresponding to building block ID ("Block ID"): D1 (see element 302D), where the lines of code for such an identified function correspond to the building block, such as building block 301D. Furthermore, analyzing engine 201 identifies the building block type for building block 301D as corresponding to getting information about the file (see element 303D).

In another example, analyzing engine 201 identifies the function write( ) (creates a communication line) corresponding to building block ID ("Block ID"): E1 (see element 302E), where the lines of code for such an identified function correspond to the building block, such as building block 301E. Furthermore, analyzing engine 201 identifies the building block type for building block 301E as corresponding to writing to the standard output (see element 303E).

In step 1102, constructing engine 202 of porting mechanism 106 constructs a tree structure for each command of source and target platforms 101, 102 with one or more building blocks from the building blocks identified by analyzing engine 201.

As stated above, in one embodiment, constructing engine 202 constructs such tree structures by analyzing the commands' system call traces.

For example, in one embodiment, constructing engine 202 analyzes the particular command's system call trace to identify the building blocks out of the building blocks identified by analyzing engine 201 based on identifying functions (e.g., openat( ), mmap( ), statx( ), write( ), etc.), where the lines of code of the function correspond to the building blocks. In one embodiment, analyzing engine 201 identifies the functions in the system call traces based on identifying terms listed in a data structure (e.g., table) corresponding to functions to be identified in the system call traces. For example, such a data structure may include the terms of "openat( )," "mmap( )," "statx( )," "write( )," etc. corresponding to functions to be identified in the system call traces. In one embodiment, such a data structure resides within the storage device (e.g., storage device 1011, 1015) of porting mechanism 106. In one embodiment, such a data structure is populated by an expert.

In one embodiment, tree structures are constructed based on such analysis of the particular command's system call trace based on determining the dependencies among the building blocks. Such dependencies, as used herein, refer to relationships between the building blocks, such as the functions of the building blocks, where one building block relies on the other to work properly. In one embodiment, such dependencies are obtained using various dependency analysis tools, which can include, but are not limited to, Math Works® (e.g., matlab.codetools.requiredFilesandProducts function), DepAn, slizaa, Softagram®, etc.

In one embodiment, based on such dependencies, a tree structure of such dependencies (parent-child relationships) is constructed by constructing engine 202. A tree structure, as used herein, refers to a hierarchical structure that is used to represent and organize the building blocks performing the task-based operations of the command. In such a hierarchical structure, the nodes in a tree structure represent the building blocks identified from analyzing the particular command's system call trace. Each node in the tree structure has zero or more child nodes, which are located beneath it in the tree structure. A node that has a child is called the child's parent node. All nodes have exactly one parent, except the topmost root node, which has none. An illustration of such a tree structure is shown in FIG. 4.

As shown in FIG. 4, tree structure 400 is constructed for a command 401 (e.g., command 1) based on the dependencies among the building blocks 402, such as building blocks A1, B1, B2, B3, C1, D1, E1 and so forth as shown in FIG. 4.

As illustrated in FIG. 4, tree structure 400 is constructed based on building blocks 402 whose corresponding block identifiers ("Block ID") and building block types ("Block Type") are shown in table 403. As illustrated in table 403, building blocks (e.g., B1, B2, and B3) with the building block type of having a common dependence library are the child nodes to the building block (e.g., A1) with the building block type corresponding to having the common dependence libraries inform. Such dependencies are illustrated in tree structure 400 by having building blocks B1, B2, and B3 be the child nodes to building block A1.

In one embodiment, constructing engine 202 is configured to construct a tree structure for each command of source and target platforms 101, 102 with one or more building blocks from the building blocks identified by analyzing engine 201 based on the determined dependencies among the building blocks using various software tools, which can include, but are not limited to, Graphviz®, Mermaid, Nomnoml, etc.

In step 1103, refinement engine 203 of porting mechanism 106 refines the command's tree structure (e.g., tree structure 400) by categorizing the building blocks of tree structure 400 as being trivial or critical based on the relatedness to the key or main function of the command. The category of "trivial," as used herein, refers to building blocks with little value or importance in accomplishing the key or main function of the command and do not need to be utilized when identifying commands of target platform 102 with a functionality within a threshold degree of similarity as the commands of source platform 101. The category of "crucial," as used herein, refers to building blocks of great importance in accomplishing the key or main function of the command and need to be utilized when identifying commands of target platform 102 with a functionality within a threshold degree of similarity as the commands of source platform 101. In one embodiment, such building blocks are categorized as being "trivial" or "critical" based on weights assigned to the building blocks. For example, a weight of 1 or less assigned to a building block indicates categorizing such a building block as being trivial; whereas, assigning a weight of greater than 1 (e.g., 3) indicates categorizing such a building block as being critical. In one embodiment, the value of the weight assigned to such building blocks is based on the degree of relatedness to the key or main function of the command.

As discussed above, in one embodiment, refinement engine 203 categorizes the building blocks of tree structure 400 based on determining the relatedness to the key or main function of the command. In one embodiment, the key or main function of the command is determined based on identifying the key or main function (e.g., provide information about the file and filesystem) of the command (e.g., stat -c) listed in a data structure (e.g., table). For example, such a data structure may include the key or main function of "providing information about the file and filesystem" corresponding to the stat -c command. Furthermore, in such a data structure, the key or main function may be associated with other functions that are of great importance for implementing such a key or main function, such as write( ), statx( ), etc. Upon identifying such functions from the data structure, refinement engine 203 attempts to identify such functions associated with the building blocks of tree structure 400. Upon identifying such functions in the building blocks of tree structure 400, such building blocks are classified as being "critical," whereas, the other building blocks are classified as being "trivial" as shown in FIG. 5. In one embodiment, such a data structure resides within the storage device (e.g., storage device 1011, 1015) of porting mechanism 106. In one embodiment, such a data structure is populated by an expert.

An example of such classification is shown in FIG. 5. Referring to FIG. 5, building blocks 501 have been identified as being trivial since such functions associated with such building blocks of tree structure 400 are of little value or importance in accomplishing the key or main function of the command. FIG. 5 further illustrates that building blocks 502 have been identified as critical since such building blocks are of great importance in accomplishing the key or main function of the command. In one embodiment, the functions (e.g., statx( ), write( )) of such building blocks 502 may have been identified in a data structure as being of great importance for implementing the key or main function of command 401. As a result, such building blocks 502 are identified as being critical.

In step 1104, refinement engine 203 of porting mechanism 106 assigns the building blocks of the command's tree structure 400 with a weight based on the relatedness to the key or main function of the command.

As discussed above, building blocks 402 of command 401 as shown in FIG. 4 may, in addition or alternatively to being classified as being "trivial" or "critical" as discussed above, be assigned a weight based on the relatedness to the key or main function of command 401. In one embodiment, the key or main function of the command is determined based on identifying the key or main function (e.g., provide information about the file and filesystem) of the command (e.g., stat -c) listed in a data structure (e.g., table). For example, such a data structure may include the key or main function of "providing information about the file and filesystem" corresponding to the stat -c command. Furthermore, in such a data structure, the key or main function may be associated with various functions that are of varying degrees of importance for implementing the key or main function. Such varying degrees of importance may be identified via an assigned weight to such a function, where the lower the value of the weight, the less important is the function for implementing the key or main function of command 401 and vice-versa. In one embodiment, such a data structure resides within the storage device (e.g., storage device 1011, 1015) of porting mechanism 106. In one embodiment, such a data structure is populated by an expert. An example of assigning each command's building blocks an appropriate weight, such as using the data structure discussed above, is illustrated in FIG. 6.

Referring to FIG. 6, FIG. 6 illustrates assigning weights to the building blocks of command 601 (e.g., stat -c '% s'/var/log/messages) from source platform 101. For instance, the openat( ) function may be of little importance to implementing the key or main function of command 601 (e.g., stat -c); whereas, the statx( ) function may be of great importance to implementing the key or main function of command 601 (stat -c). As a result, a higher weight (e.g., 3) may be assigned to building block 602A associated with the function of statx( ) and a lower weight (e.g., 0.5) may be assigned to the building blocks 602B-602C associated with the function of openat( ).

FIG. 6 further illustrates assigning weights to the building blocks of command 603 (e.g., ls -l/var/log/messages) from target platform 102. For instance, the openat( ) function may be of little importance to implementing the key or main function of command 603 (e.g., ls -l); whereas, the statx( ) function may be of great importance to implementing the key or main function of command 603 (e.g., ls -l). As a result, a higher weight (e.g., 3) may be assigned to building block 602D associated with the function of statx( ) and a lower weight (e.g., 0.5) may be assigned to the building blocks 602E-602G associated with the function of openat( ).

In step 1105, comparison module 204 of porting mechanism 106 identifies the commands of target platform 102 with a functionality within a threshold degree of similarity, which may be user-designated, to the commands of source platform 101 by analyzing the building blocks of the commands' tree structures 400 for those commands categorized as critical and/or with a weight that exceeds a threshold value.

As stated above, in one embodiment, such similarity between the commands of source platform 101 and target platform 102 may be determined by vectorizing the building blocks of the commands, including the actions, parameters, inputs, functions, etc. of the building blocks, such as via Word2vec, Doc2Vec, GloVe, etc. After being converted into real-valued vectors, a similarity measure, such as cosine similarity or the Euclidean distance, may be used to determine the similarity between the commands of source platform 101 and target platform 102. Such a similarity measure is compared to a threshold value, which may be user-designated, to determine if the commands are within a threshold degree of similarity to one another. If the similarity measure exceeds such a threshold value, then the commands are deemed to be within a threshold degree of similarity. Otherwise, the commands are not deemed to be within the threshold degree of similarity.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the commands are deemed to be within a threshold degree of similarity. Otherwise, the commands are not deemed to be within the threshold degree of similarity.

In one embodiment, the Euclidean distance is calculated as the square root of the sum of the squared differences between the two feature vectors. If the distance exceeds a threshold value, which may be user-designated, then the commands are deemed to be within a threshold degree of similarity. Otherwise, the commands are not deemed to be within the threshold degree of similarity.

In one embodiment, the similarity measure is a score between the values of 0 and 1 for vectors that have only positive values. In one embodiment, any negative scores can be made positive by taking its absolute value.

Comparison module 204 utilizes various software tools for generating the similarity score, which can include, but are not limited to, TensorFlow®, MathWorks®, plus sklearn, scikit-learn®, etc.

An illustration of comparison module 204 identifying a command(s) of source platform 101 with a functionality within a threshold degree of similarity to a command(s) of target platform 102 by analyzing the building blocks of the commands' tree structures 400 for those command categorized as critical and/or with a weight that exceeds a threshold value is provided in FIG. 7.

As shown in FIG. 7, the mktemp command 701 of source platform 101 has a functionality within a threshold degree of similarity to the combination of the head/dev/urandom command 702 and mkdir command 703 of target platform 102 (e.g., z/OS®). As illustrated in FIG. 7, the mktemp command 701 includes building blocks 602C, 602H, and 602I, which together have a functionality within the threshold degree of similarity to the combination of the head/dev/urandom command 702 and mkdir command 703 of target platform 102 (e.g., z/OS®). As further illustrated in FIG. 7, the head/dev/urandom command 702 includes building blocks 602E, and 602J and the mkdir command 703 includes building blocks 602E, and 602K.

Another example of identifying a command(s) of source platform 101 with a functionality within a threshold degree of similarity to a command(s) of target platform 102 is provided in FIG. 8.

As shown in FIG. 8, the stat -c command 601 of source platform 101 has a functionality within a threshold degree of similarity to the ls -l command 603 of target platform 102 (e.g., z/OS®). As illustrated in FIG. 8, the stat -c command 601 (e.g., stat -c '% s'/var/log/messages) includes building blocks 602A, 602B, and 602C, which together have a functionality within the threshold degree of similarity to the ls -l command 603 (e.g., ls -l/var/log/messages), which includes building blocks 602D, 602E, 602F, and 602G. For example, the information returned by the ls -l command 603 of target platform 102 corresponds to the information returned by the stat -c command 601 of source platform 101.

In step 1106, labeling engine 205 of porting mechanism 106 labels each command of source platform 101 and/or target platform 102 with the designation of "same," "mismatch," or "missing" based on comparing the building blocks for each command of target platform 102 with the building blocks of commands of source platform 101.

As discussed above, the designation of "same," as used herein, refers to a command of source platform 101 or target platform 102 that has an appearance and a functionality within a threshold degree of similarity of a command of target platform 101 or source platform 101, respectively. The designation of "mismatch," as used herein, refers to a command of source platform 101 or target platform 102 that has an appearance within a threshold degree of similarity of a command of target platform 102 or source platform 101, respectively, but does not have a functionality within a threshold degree of similarity of the command of target platform 102 or source platform 101, respectively. The designation of "missing," as used herein, refers to a command of source platform 101 or target platform 102 that has a functionality within a threshold degree of similarity of a command of target platform 102 or source platform 101, respectively, but does not have an appearance within a threshold degree of similarity of the command of target platform 102 or source platform 101, respectively. The designations of "mismatch" and "missing" are indications of commands, such as the commands of source platform 101, that are not supported by target platform 102.

In one embodiment, comparison engine 204 determines whether the appearance of the command of source platform 101 and/or target platform 102 is within a threshold degree of similarity to the appearance of the command of target platform 102 and/or source platform 101, respectively, based on vectorizing the commands of source and target platforms 101, 102. After being converted into real-valued vectors, a similarity measure, such as cosine similarity or the Euclidean distance, may be used to determine the similarity between the appearance of the commands of source platform 101 and target platform 102. Such a similarity measure is compared to a threshold value, which may be user-designated, to determine if the appearance of the commands are within a threshold degree of similarity to one another. If the similarity measure exceeds such a threshold value, then the appearance of the commands are deemed to be within a threshold degree of similarity. Otherwise, the appearance of the commands are not deemed to be within the threshold degree of similarity.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the functionality of the commands are deemed to be within a threshold degree of similarity. Otherwise, the appearance of the commands are not deemed to be within the threshold degree of similarity.

In one embodiment, the Euclidean distance is calculated as the square root of the sum of the squared differences between the two feature vectors. If the distance exceeds a threshold value, which may be user-designated, then the appearance of the commands are deemed to be within a threshold degree of similarity. Otherwise, the appearance of the commands are not deemed to be within the threshold degree of similarity.

In one embodiment, the similarity measure is a score between the values of 0 and 1 for vectors that have only positive values. In one embodiment, any negative scores can be made positive by taking its absolute value.

Comparison engine 204 utilizes various software tools for generating the similarity score, which can include, but are not limited to, TensorFlow®, MathWorks®, plus sklearn, scikit-learn®, etc.

In one embodiment, comparison engine 204 determines whether the functionality of the command of source platform 101 and/or target platform 102 is within a threshold degree of similarity to the functionality of the command of target platform 102 and/or source platform 101, respectively, based on vectorizing the commands of source and target platforms 101, 102 by vectorizing the building blocks of the commands, including the actions, parameters, inputs, functions, etc. of the building blocks, such as via Word2vec, Doc2Vec, GloVe, etc. After being converted into real-valued vectors, a similarity measure, such as cosine similarity or the Euclidean distance, may be used to determine the similarity between the functionality of the commands of source platform 101 and target platform 102. Such a similarity measure is compared to a threshold value, which may be user-designated, to determine if the functionality of the commands are within a threshold degree of similarity to one another. If the similarity measure exceeds such a threshold value, then the functionality of the commands are deemed to be within a threshold degree of similarity. Otherwise, the functionality of the commands are not deemed to be within the threshold degree of similarity.

"Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the functionality of the commands are deemed to be within a threshold degree of similarity. Otherwise, the functionality of the commands are not deemed to be within the threshold degree of similarity.

In one embodiment, the Euclidean distance is calculated as the square root of the sum of the squared differences between the two feature vectors. If the distance exceeds a threshold value, which may be user-designated, then the functionality of the commands are deemed to be within a threshold degree of similarity. Otherwise, the functionality of the commands are not deemed to be within the threshold degree of similarity.

In one embodiment, the similarity measure is a score between the values of 0 and 1 for vectors that have only positive values. In one embodiment, any negative scores can be made positive by taking its absolute value.

Comparison module 204 utilizes various software tools for generating the similarity score, which can include, but are not limited to, TensorFlow®, MathWorks®, plus sklearn, scikit-learn®, etc.

Based on the findings of comparison module 204 as to whether the commands of source platform 101 and/or target platform 102 have an appearance and functionality within the threshold degree of similarity of the commands of target platform 102 and/or source platform 101, respectively, labeling engine 205 labels such commands of source platform 101 appropriately (e.g., "same," "mismatch," or "missing") as illustrated in FIG. 9.

As shown in FIG. 9, the commands of source platform 101/target platform 102 are labeled as "same" 901, "mismatch" 902 and "missing" 903. As illustrated in FIG. 9, the commands of cd 904, mkdir 703, ls -l 603, cp 905, and head/dev/urandom 702 of target platform 102 are labeled as "same" 901 since such commands have an appearance and functionality within the threshold degree of similarity of the commands of source platform 101.

As further illustrated in FIG. 9, the commands of mount-f 906 and stat -c 601 of source platform 101 (e.g., Linux® platform) are labeled as mismatch 902 since such commands have an appearance within a threshold degree of similarity of a command of target platform 102 but do not have a functionality within a threshold degree of similarity of the command of target platform 102. FIG. 9 further illustrates an alternative command for performing the command of stat -c 601 of source platform 101, which corresponds to the ls -l command 603 of target platform 102 as shown via arrow 907.

Furthermore, as illustrated in FIG. 9, the commands of mktemp 701 and date +% s 908 of source platform 101 (e.g., Linux® platform) are labeled as missing 903 as such commands have a functionality within a threshold degree of similarity of a command of target platform 102 but do not have an appearance within a threshold degree of similarity of the command of target platform 102. FIG. 9 further illustrates an alternative command for performing the command of mktemp 701 of source platform 101, which corresponds to the combination of the mkdir 703 and head/dev/urandom 702 commands of target platform 102 as shown via arrow 909.

In step 1107, generator engine 206 of porting mechanism 106 generates, if possible, alternative commands for the commands of source platform 101 labeled as mismatch and/or missing.

As stated above, in one embodiment, generator engine 206 generates such alternative commands based on the commands of target platform 102 identified by comparison module 204 as having a functionality within a threshold degree of similarity, which may be user-designated, to the commands of source platform 101. For example, comparison module 204 may have identified the command of ls -l 603 from target platform 102 as having the same functionality (or within a threshold degree of similarity) as the command of stat -c 601 as identified by arrow 907 in FIG. 9. In another example, comparison module 204 may have identified the commands of mkdir 703 and head/dev/urandom 702 from target platform 102 as having the same functionality (or within a threshold degree of similarity) as the command of mktemp 701 as identified by arrow 909 in FIG. 9. As a result of identifying such alternative commands by comparison module 204, generator engine 206 generates, if possible, alternative commands for the commands of source platform 101 labeled as mismatch and/or missing, which is an indication of a command unsupported by target platform 102.

For example, referring to FIG. 9, the command of stat -c 601 of source platform 101 is identified as being classified as mismatch 902. Since comparison module 204 identified an alternative command (e.g., ls -l 603) of target platform 102 for the command of stat -c 601 of source platform 101, as illustrated by arrow 907 of FIG. 9, such an alternative command is generated by generator engine 206. In another example, the command of mktemp 701 of source platform 101 is identified as being classified as missing 903 as shown in FIG. 9. Since comparison module 204 identified an alternative command (e.g., combination of the commands of mkdir 703 and head/dev/urandom 702) of target platform 102 for the command of mktemp 701 of source platform 101, as illustrated by arrow 909, such an alternative command is generated by generator engine 206.

In step 1108, generator engine 206 of porting mechanism 106 adapts the script from source platform 101 to be utilized in target platform 102 by using such generated alternative commands. For example, as discussed above, the command of mktemp 701 of source platform 101 (e.g., Linux®) is classified as "missing" since such a command does not have a command with a functionality within a threshold degree of similarity of a command of target platform 102 (e.g., z/OS®). However, the command of mktemp 701 does have an alternative command that was generated by generator engine 206, such as the combination of the mkdir 703 and head/dev/urandom 702 commands of target platform 102. As a result, generator engine 206 adapts the script from source platform 101 to be utilized in target platform 102 by replacing the command of mktemp 701 in the script for source platform 101 with the combined commands of mkdir 703 and head/dev/urandom 702 of target platform 102.

In another example, the command of stat -c 601 of source platform 101 (e.g., Linux®) is classified as "mismatch" since such a command does not have a command with an appearance within a threshold degree of similarity of a command of target platform 102 (e.g., z/OS®). However, the command of stat -c 601 does have an alternative command that was generated by generator engine 206, such as the command of ls -l 603 of target platform 102 which returns the same information as the information returned by the stat -c command 601. As a result, generator engine 206 adapts the script from source platform 101 to be utilized in target platform 102 by replacing the stat -c command 601 in the script for source platform 101 with the command of ls -l 603 of target platform 102.

In this manner, scripts from a source platform (e.g., Linux®) which contain commands unsupported by a target platform (e.g., z/OS®) are adapted to be utilized in the target platform (e.g., z/OS®) when porting, such as porting open-source tools.

A further discussion regarding adapting scripts from source platform 101 to be utilized in target platform 102 by replacing commands that are unsupported by the target platform with alternative commands that are supported by the target platform is provided below in connection with FIG. 12.

FIG. 12 is a flowchart of a method 1200 for adapting scripts from a source platform (e.g., source platform 101 of FIG. 1) to be utilized in a target platform (e.g., target platform 102 of FIG. 1) by replacing commands in the script for the source platform that are unsupported by the target platform with alternative commands that are supported by the target platform in accordance with an embodiment of the present disclosure.

Referring to FIG. 12, in conjunction with FIGS. 1-11, in step 1201, parser 207 of porting mechanism 106 parses the incoming script for source platform 101 line by line.

"Parsing," as used herein, refers to analyzing and breaking down a sequence of input symbols or tokens into its component parts to determine its structure and meaning. Examples of parser 207 performing such parsing can include, but are not limited to, ANTLR®, Bison, Lemon, Lex, Parboiled, Ragel, XPL, etc.

In step 1202, comparison module 204 of porting mechanism 106 identifies a command in the parsed script, such as for the recent line of the incoming script that was parsed.

In one embodiment, comparison module 204 is configured to identify a command in the parsed script based on matching the name of a command (e.g., stat -c) in the parsed script with a listing of commands in a data structure (e.g., table) for various platforms, including both source and target platforms 101, 102. In one embodiment, such a data structure resides within the storage device (e.g., 1011, 1015) of porting mechanism 106. In one embodiment, such a data structure is populated by an expert.

Upon identifying a command in the parsed script, in step 1203, generator engine 206 of porting mechanism 106 determines whether the identified command is labeled the "same" 901.

For example, as discussed above, labeling engine 205 labels various commands with the designations of "same," "mismatch," or "missing." In one embodiment, generator engine 206 accesses a data structure (e.g., table) with information as shown in FIG. 9 that was populated by labeling engine 205. In one embodiment, such a data structure resides within the storage device (e.g., storage device 1011, 1015) of porting mechanism 106. Upon locating the command identified in step 1202 in such a data structure, generator engine 206 determines if such a command is labeled under the category of "same" 901.

If the identified command is labeled with the designation of "same," then, in step 1204, generator engine 206 of porting mechanism 106 writes the line of script from the parsed incoming script with the identified command in the output script for target platform 102.

If, however, the identified command is not identified as being labeled with the designation of "same," then such an identified command is identified as being either "mismatch" or "missing." As a result, if the identified command is not identified as being labeled with the designation of "same," then, in step 1205, generator engine 206 of porting mechanism 106 determines whether there are any alternative commands for the commands of source platform 101 that are labeled as "mismatch" or "missing."

As discussed above, labeling engine 205 labels various commands with the designations of "same," "mismatch," or "missing." In one embodiment, generator engine 206 accesses a data structure (e.g., table) with information as shown in FIG. 9 that was populated by labeling engine 205. Upon locating the command identified in step 1202 in such a data structure, generator engine 206 determines if such a command is labeled under the category of "mismatch" 902 or "missing" 903. Upon identifying the command labeled as "mismatch" 902 or "missing" 903, generator engine 206 determines if such a command has an alternative command that was identified by comparison module 204, where such information (e.g., information such as shown by arrows 907, 909 in FIG. 9) was stored in a data structure (e.g., table) populated by labeling engine 205. As a result, generator engine 206 performs a look-up of such a data structure to identify any alternative command for the command identified in step 1202. In one embodiment, such a data structure resides within the storage device (e.g., storage device 1011, 1015) of porting mechanism 106.

If there is not an alternative command for the command identified in step 1202, then, in step 1206, generator engine 206 of porting mechanism 106 inserts a warning message in the output script for target platform 102 that the command is labeled as mismatch or missing but with no generated alternative commend.

If, however, there is an alternative command, then, in step 1207, generator engine 206 of porting mechanism 106 replaces the command from the line of script in the parsed incoming script with the generated alternative command (generated in step 1107 of FIG. 11) and writes the line of script from the incoming script with the replaced command in the output script for target platform 102. For example, the command of stat -c 601 in the incoming script of source platform 101 is replaced with the alternative command of ls -l 603 as shown in FIG. 9, where the line of script from the parsed incoming script with such a replacement is then written to the output script for target platform 102.

As discussed above, generator engine 206 utilizes various software tools for writing lines of code in the output script, inserting warning messages in the output script, replacing commands in the incoming script with alternative commands to be written to the output script, etc., which can include, but are not limited to, UltraEdit®, Xcode®, CodeLite, Emacs®, Vim®, etc.

Upon writing the line of script with the identified command in the output script for target platform 102 or upon inserting the warning message in the output script for target platform 102 or upon replacing the command in the incoming script with the generated alternative command and writing the line of script from the incoming script with the replaced command in the output script, in step 1208, parser 207 of porting mechanism 106 determines if there are more lines in the incoming script to be parsed.

If there are no more lines in the incoming script to be parsed, then, in step 1209, generator engine 206 of porting mechanism 106 issues the output script to target platform 106 to be executed on target platform 106.

If, however, there are more lines in the incoming script to be parsed, then parser 207 of porting mechanism 106 parses the next line in the incoming script for source platform 101 in step 1201.

In this manner, scripts from a source platform with commands that are not supported by the target platform may now be adapted in a manner that enables such scripts to be executed on the target platform.

Furthermore, the principles of the present disclosure improve the technology or technical field involving porting.

As discussed above, when porting software, such as open-source tools, across different operating systems (e.g., Linux®, iOS®, Unix®, etc.) and/or hardware platforms (e.g., x86, Arm®, etc.), many scripts from a source platform need to be modified in order to be executed successfully on a target platform. A script refers to a program or sequence of instructions that is interpreted or carried out by another program rather than by the computer processor. A platform refers to the hardware and software (operation system) on which software applications can be run. A source platform refers to the platform upon which the scripts were originally designed for execution. A target platform refers to the platform upon which the scripts are desired to be executed. For example, the script for a BATS (Bash Automated Testing System) framework in a source platform, such as the Linux® platform, may not be supported by the target platform (e.g., z/OS®). For instance, the commands of the script for the BATS framework may be not supported by the target platform. If the target platform does not report errors or warnings regarding unsupported commands, then the user will have no knowledge of such unsupported commands. As a result, the user may spend enormous time in attempting to identify the reasons for the script not executing on the target platform as well as spend enormous time in modifying the script in order to be properly executed on the target platform. Unfortunately, there is not currently a means for informing the user regarding unsupported commands. Neither is there a means for automatically modifying the scripts from the source platform in order to be correctly executed on the target platform.

Embodiments of the present disclosure improve such technology by analyzing traces of system calls from the commands in the source and target platforms to identify building blocks. A "system call," as used herein, is the programmatic way in which a computer program requests a service from the operating system on which it is executed. A "system call trace," as used herein, refers to the specialized use of logging to record information about the system call. A "building block," as used herein, refers to a portion of the script that contains functionality for performing task-based operations. A tree structure for each command of the source and target platforms is constructed with one or more building blocks from the identified building blocks. In one embodiment, such tree structures are constructed by analyzing the commands' system call traces. Commands of the target platform with a functionality within a threshold degree of similarity, which may be user-designated, to the commands of the source platform are identified by analyzing the building blocks of the commands' tree structures. In one embodiment, such similarity between the commands of the source and target platforms are determined by vectorizing the building blocks of the commands, including the actions, parameters, inputs, functions, etc. of the building blocks. After being converted into real-valued vectors, a similarity measure, such as cosine similarity or the Euclidean distance, may be used to determine the similarity between the commands of the source and target platforms. Alternative commands for the commands of the source platform, such as those commands that are not supported by the target platform, may then be generated using such identified commands. The script from the source platform may then be adapted to be utilized in the target platform using such generated alternative commands. For example, the script from the source platform may be adapted by replacing commands in the script that are not supported by the target platform with alternative commands that are supported by the target platform. For instance, a command from the script of the source platform that is mismatched (command used in the source platform with an appearance to a command used in the target platform but with a different functionality) or missing (command used in the source platform with the same functionality as a command from the target platform but with a different appearance) may be replaced with such a generated alternative command thereby enabling the script of the source platform to be adapted to be executed on the target platform. In this manner, scripts from a source platform with commands that are not supported by the target platform may now be adapted in a manner that enables such scripts to be executed on the target platform. Furthermore, in this manner, there is an improvement in the technical field involving porting.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for adapting scripts from a source platform to be utilized in a target platform when porting, the method comprising:
analyzing system call traces of commands from said source and target platforms to identify building blocks;
constructing a tree structure for each command of said source and target platforms with one or more building blocks of said identified building blocks;
identifying commands of said target platform with a functionality within a threshold degree of similarity of commands of said source platform by analyzing building blocks of said tree structures of said commands of said source and target platforms;
generating one or more alternative commands for said source platform using said identified commands of said target platform with said functionality within said threshold degree of similarity of said commands of said source platform; and
adapting a script from said source platform to be utilized in said target platform using said generated one or more alternative commands.

2. The method as recited in claim 1 further comprising:
labeling each command of said source platform and/or said target platform with a designation of same, mismatch or missing based on comparing building blocks of said constructed tree structure for each command of said target platform with building blocks of said constructed tree structure for each command of said source platform, wherein a command labeled said same corresponds to a command of said source platform or said target platform that has an appearance and a functionality within a threshold degree of similarity of a command of said target platform or said source platform, respectively, wherein a command labeled said mismatch corresponds to a command of said source platform or said target platform that has an appearance within a threshold degree of similarity of a command of said target platform or said source platform, respectively, but does not have a functionality within a threshold degree of similarity of said command of said target platform or said source platform, respectively, wherein a command labeled said missing corresponds to a command of said source platform or said target platform that has a functionality within a threshold degree of similarity of a command of said target platform or said source platform, respectively, but does not have an appearance within a threshold degree of similarity of said command of said target platform or said source platform, respectively; and
generating said one or more alternative commands for commands labeled as said mismatch and/or said missing for said source platform using said identified commands of said target platform with said functionality within said threshold degree of similarity as said commands of said source platform.

3. The method as recited in claim 1 further comprising:
parsing an incoming script from said source platform line by line; and
identifying a command from a line of script in said parsed incoming script.

4. The method as recited in claim 3 further comprising:
writing said line of script from said parsed incoming script in an output script for said target platform in response to said command identified from said line of script in said parsed incoming script being labeled in a first category.

5. The method as recited in claim 3 further comprising:
replacing said command from said line of script in said parsed incoming script with a generated alternative command in response to said command from said line of script in said parsed incoming script being labeled in a second category or a third category and in response to said alternative command being generated for said command.

6. The method as recited in claim 3 further comprising:
issuing a warning message in an output script for said target platform in response to said command identified from said line of script in said parsed incoming script being labeled in a second category or a third category and in response to an alternative command not being generated for said command.

7. The method as recited in claim 1 further comprising:
categorizing said one or more building blocks of said constructed tree structure into a first category or a second category based on relatedness to a function of a command of said constructed tree structure; and
identifying commands of said target platform with said functionality within said threshold degree of similarity of said commands of said source platform by analyzing said building blocks of said tree structures of said commands of said source and target platforms that are categorized in said first category.

8. A computer program product for adapting scripts from a source platform to be utilized in a target platform when porting, the computer program product comprising one or more computer readable storage mediums having program code embodied therewith, the program code comprising programming instructions for:
analyzing system call traces of commands from said source and target platforms to identify building blocks;
constructing a tree structure for each command of said source and target platforms with one or more building blocks of said identified building blocks;
identifying commands of said target platform with a functionality within a threshold degree of similarity of commands of said source platform by analyzing building blocks of said tree structures of said commands of said source and target platforms;
generating one or more alternative commands for said source platform using said identified commands of said target platform with said functionality within said threshold degree of similarity of said commands of said source platform; and
adapting a script from said source platform to be utilized in said target platform using said generated one or more alternative commands.

9. The computer program product as recited in claim 8, wherein the program code further comprises the programming instructions for:
labeling each command of said source platform and/or said target platform with a designation of same, mismatch or missing based on comparing building blocks of said constructed tree structure for each command of said target platform with building blocks of said constructed tree structure for each command of said source platform, wherein a command labeled said same corresponds to a command of said source platform or said target platform that has an appearance and a functionality within a threshold degree of similarity of a command of said target platform or said source platform, respectively, wherein a command labeled said mismatch corresponds to a command of said source platform or said target platform that has an appearance within a threshold degree of similarity of a command of said target platform or said source platform, respectively, but does not have a functionality within a threshold degree of similarity of said command of said target platform or said source platform, respectively, wherein a command labeled said missing corresponds to a command of said source platform or said target platform that has a functionality within a threshold degree of similarity of a command of said target platform or said source platform, respectively, but does not have an appearance within a threshold degree of similarity of said command of said target platform or said source platform, respectively; and
generating said one or more alternative commands for commands labeled as said mismatch and/or said missing for said source platform using said identified commands of said target platform with said functionality within said threshold degree of similarity as said commands of said source platform.

10. The computer program product as recited in claim 8, wherein the program code further comprises the programming instructions for:
parsing an incoming script from said source platform line by line; and
identifying a command from a line of script in said parsed incoming script.

11. The computer program product as recited in claim 10, wherein the program code further comprises the programming instructions for:
writing said line of script from said parsed incoming script in an output script for said target platform in response to said command identified from said line of script in said parsed incoming script being labeled in a first category.

12. The computer program product as recited in claim 10, wherein the program code further comprises the programming instructions for:
replacing said command from said line of script in said parsed incoming script with a generated alternative command in response to said command from said line of script in said parsed incoming script being labeled in a second category or a third category and in response to said alternative command being generated for said command.

13. The computer program product as recited in claim 10, wherein the program code further comprises the programming instructions for:
issuing a warning message in an output script for said target platform in response to said command identified from said line of script in said parsed incoming script being labeled in a second category or a third category and in response to an alternative command not being generated for said command.

14. The computer program product as recited in claim 8, wherein the program code further comprises the programming instructions for:
categorizing said one or more building blocks of said constructed tree structure into a first category or a second category based on relatedness to a function of a command of said constructed tree structure; and
identifying commands of said target platform with said functionality within said threshold degree of similarity of said commands of said source platform by analyzing said building blocks of said tree structures of said commands of said source and target platforms that are categorized in said first category.

15. A system, comprising:
a memory for storing a computer program for adapting scripts from a source platform to be utilized in a target platform when porting; and
a processor connected to said memory, wherein said processor is configured to execute program instructions of the computer program comprising:
   analyzing system call traces of commands from said source and target platforms to identify building blocks;
   constructing a tree structure for each command of said source and target platforms with one or more building blocks of said identified building blocks;
   identifying commands of said target platform with a functionality within a threshold degree of similarity of commands of said source platform by analyzing building blocks of said tree structures of said commands of said source and target platforms;
   generating one or more alternative commands for said source platform using said identified commands of said target platform with said functionality within said threshold degree of similarity of said commands of said source platform; and
   adapting a script from said source platform to be utilized in said target platform using said generated one or more alternative commands.

16. The system as recited in claim 15, wherein the program instructions of the computer program further comprise:
   labeling each command of said source platform and/or said target platform with a designation of same, mismatch or missing based on comparing building blocks of said constructed tree structure for each command of said target platform with building blocks of said constructed tree structure for each command of said source platform, wherein a command labeled said same corresponds to a command of said source platform or said target platform that has an appearance and a functionality within a threshold degree of similarity of a command of said target platform or said source platform, respectively, wherein a command labeled said mismatch corresponds to a command of said source platform or said target platform that has an appearance within a threshold degree of similarity of a command of said target platform or said source platform, respectively, but does not have a functionality within a threshold degree of similarity of said command of said target platform or said source platform, respectively, wherein a command labeled said missing corresponds to a command of said source platform or said target platform that has a functionality within a threshold degree of similarity of a command of said target platform or said source platform, respectively, but does not have an appearance within a threshold degree of similarity of said command of said target platform or said source platform, respectively; and
   generating said one or more alternative commands for commands labeled as said mismatch and/or said missing for said source platform using said identified commands of said target platform with said functionality within said threshold degree of similarity as said commands of said source platform.

17. The system as recited in claim 15, wherein the program instructions of the computer program further comprise:
   parsing an incoming script from said source platform line by line; and
   identifying a command from a line of script in said parsed incoming script.

18. The system as recited in claim 17, wherein the program instructions of the computer program further comprise:
   writing said line of script from said parsed incoming script in an output script for said target platform in response to said command identified from said line of script in said parsed incoming script being labeled in a first category.

19. The system as recited in claim 17, wherein the program instructions of the computer program further comprise:
   replacing said command from said line of script in said parsed incoming script with a generated alternative command in response to said command from said line of script in said parsed incoming script being labeled in a second category or a third category and in response to said alternative command being generated for said command.

20. The system as recited in claim 17, wherein the program instructions of the computer program further comprise:
   issuing a warning message in an output script for said target platform in response to said command identified from said line of script in said parsed incoming script being labeled in a second category or a third category and in response to an alternative command not being generated for said command.

* * * * *